(12) United States Patent
Tsujimoto et al.

(10) Patent No.: US 7,787,985 B2
(45) Date of Patent: Aug. 31, 2010

(54) ARTICLE STORAGE FACILITY AND METHOD FOR OPERATING THE FACILITY

(75) Inventors: Kazushi Tsujimoto, Gamo-gun (JP); Yuichi Ueda, Gamo-gun (JP); Kunihiro Tsukamoto, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 1000 days.

(21) Appl. No.: 11/440,691

(22) Filed: May 25, 2006

(65) Prior Publication Data
US 2006/0285948 A1 Dec. 21, 2006

(30) Foreign Application Priority Data
May 27, 2005 (JP) ............................. 2005-155695
Feb. 9, 2006 (JP) ............................. 2006-032431

(51) Int. Cl.
*G06F 7/00* (2006.01)
(52) U.S. Cl. ...................... 700/214; 414/273
(58) Field of Classification Search ................. 700/214; 414/273, 267
See application file for complete search history.

(56) References Cited

U.S. PATENT DOCUMENTS

| | | | |
|---|---|---|---|
| 5,593,267 A * | 1/1997 | McDonald et al. .......... 414/273 |
| 5,914,919 A * | 6/1999 | Fosler et al. ............. 369/30.31 |
| 6,416,270 B1 * | 7/2002 | Steury et al. ................ 414/282 |
| 6,570,734 B2 * | 5/2003 | Ostwald et al. ............ 360/92.1 |
| 7,101,139 B1 * | 9/2006 | Benedict ...................... 414/281 |
| 7,381,022 B1 * | 6/2008 | King .......................... 414/267 |
| 2003/0125834 A1 * | 7/2003 | Campbell et al. ........... 700/214 |
| 2005/0053450 A1 * | 3/2005 | Kantola et al. .............. 414/273 |
| 2005/0246065 A1 * | 11/2005 | Ricard ........................ 700/258 |
| 2008/0075569 A1 * | 3/2008 | Benedict et al. ............. 414/269 |

FOREIGN PATENT DOCUMENTS

| | | |
|---|---|---|
| EP | 1 512 661 A1 | 9/2005 |
| JP | 2000-229708 | 8/2000 |
| JP | 2002-175117 | 6/2002 |

OTHER PUBLICATIONS

European Search Report dated Sep. 22, 2006.

* cited by examiner

*Primary Examiner*—Gene Crawford
*Assistant Examiner*—Ramya Prakasam
(74) *Attorney, Agent, or Firm*—The Webb Law Firm

(57) ABSTRACT

In response to a storing command to store a plurality of articles to different storage units of the rack, the control device of article storage facility performs a multiple storing operation wherein the control device controls horizontal movements of the plurality of moving members, vertical movements of the plurality of transfer device provided to each of the plurality of moving members, and transfer operations of the plurality of transfer device in order to cause the plurality of the transfer device: to be at respective storage/retrieval positions; to receive articles from respective article supports; and to move to rack side article transfer positions corresponding to the storage units in which the articles are to be stored and d) to transfer the received articles to the storage units.

16 Claims, 19 Drawing Sheets

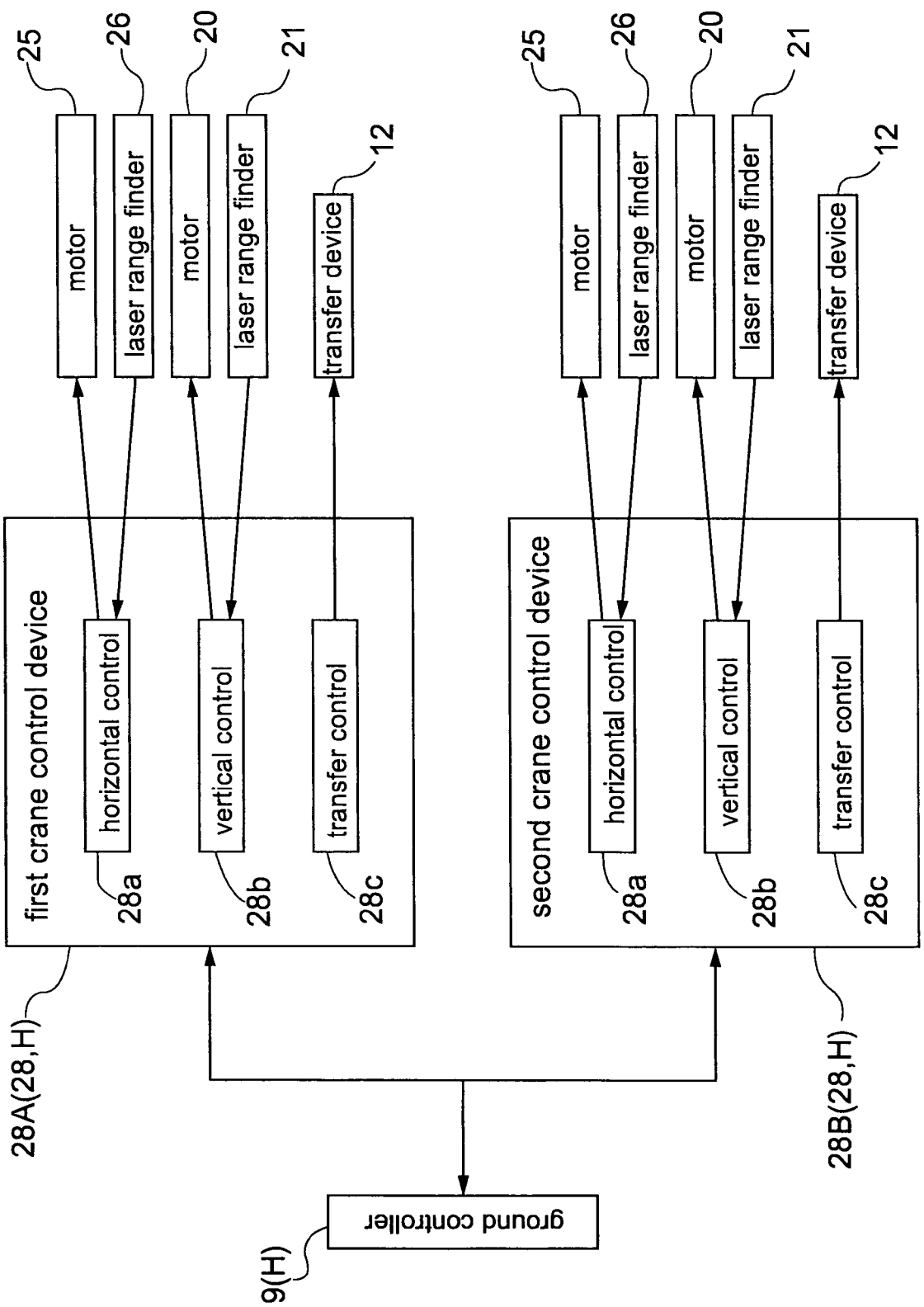

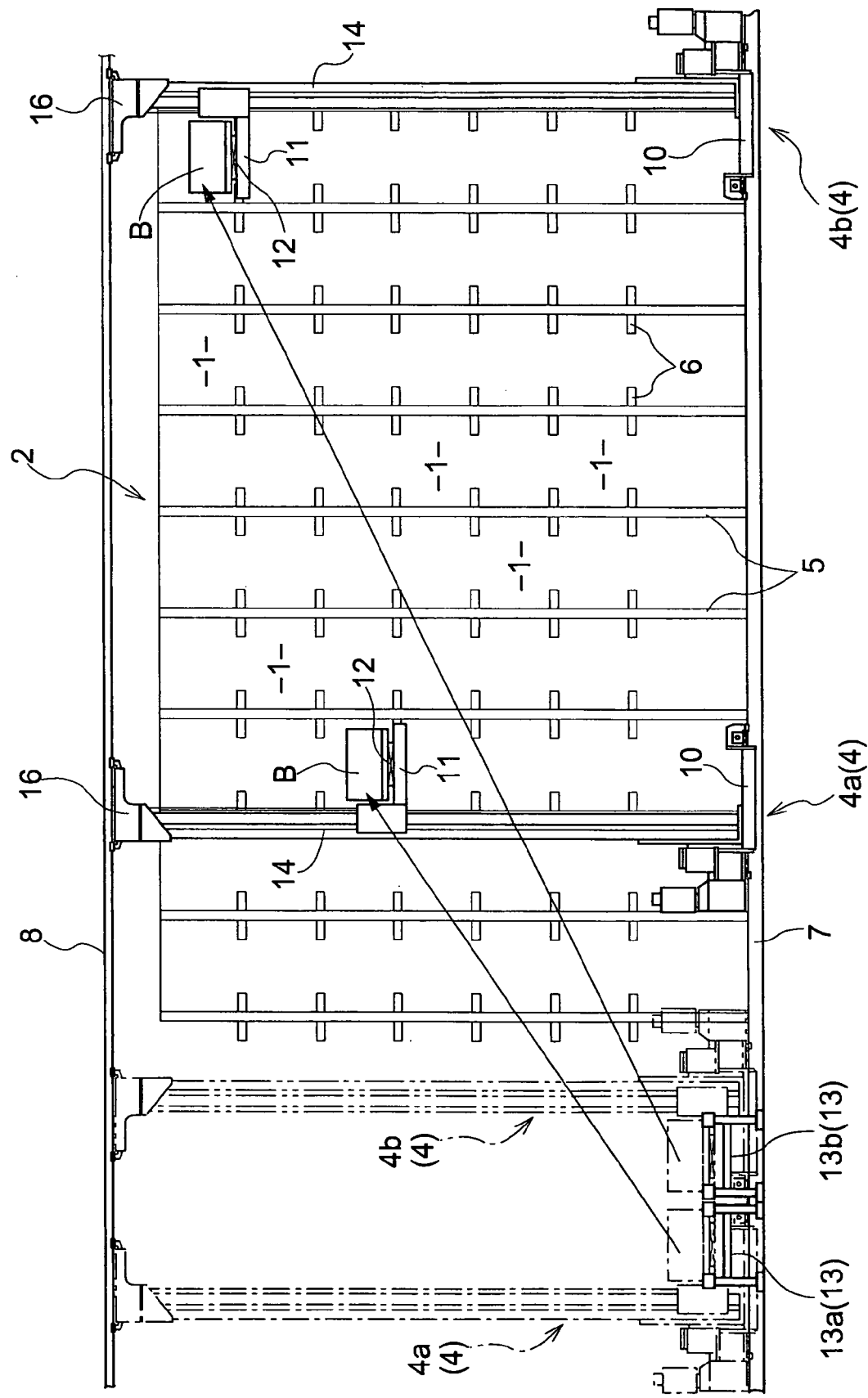
FIG.4 simultaneous storage operation

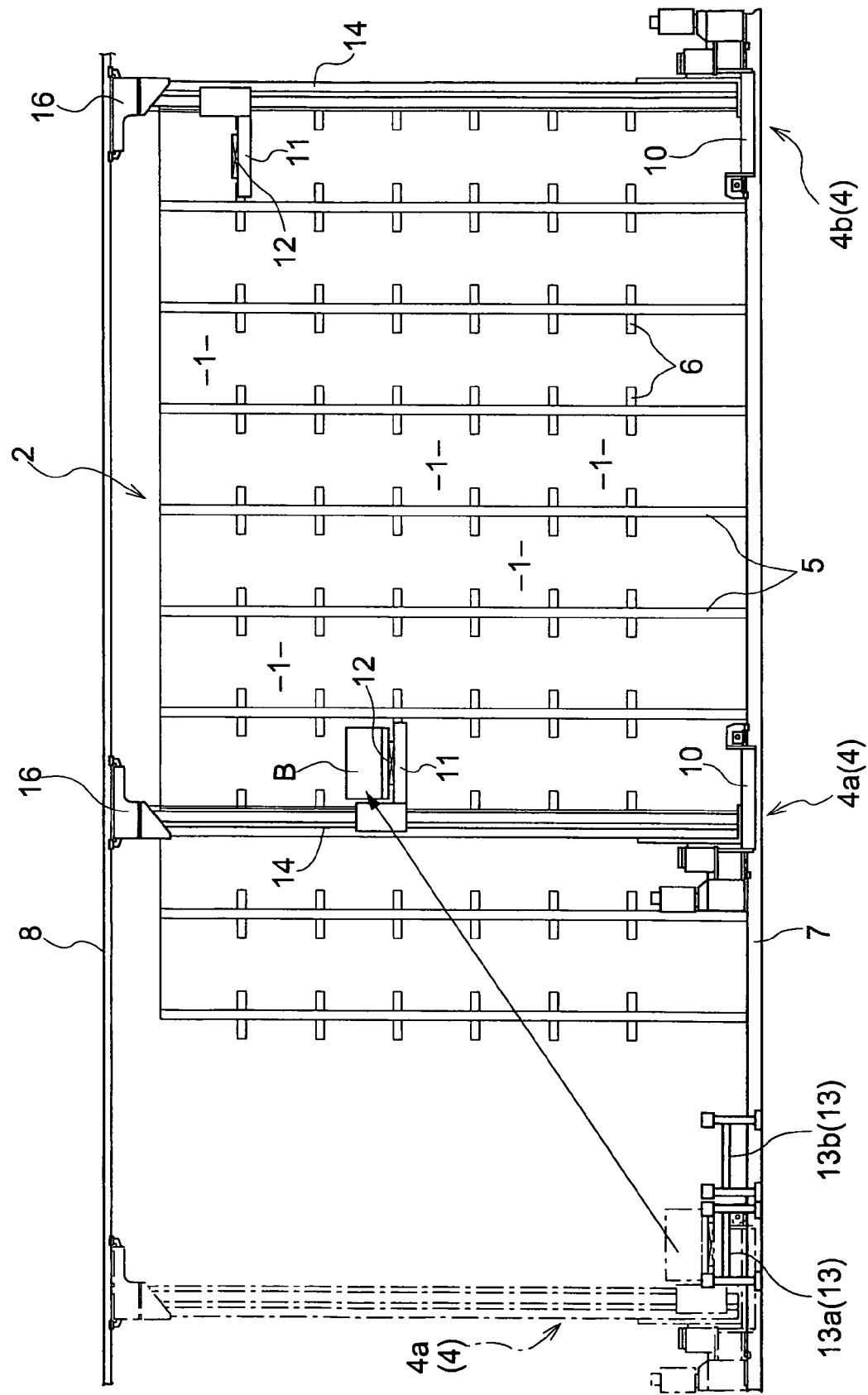
FIG.5 First individual storage operation

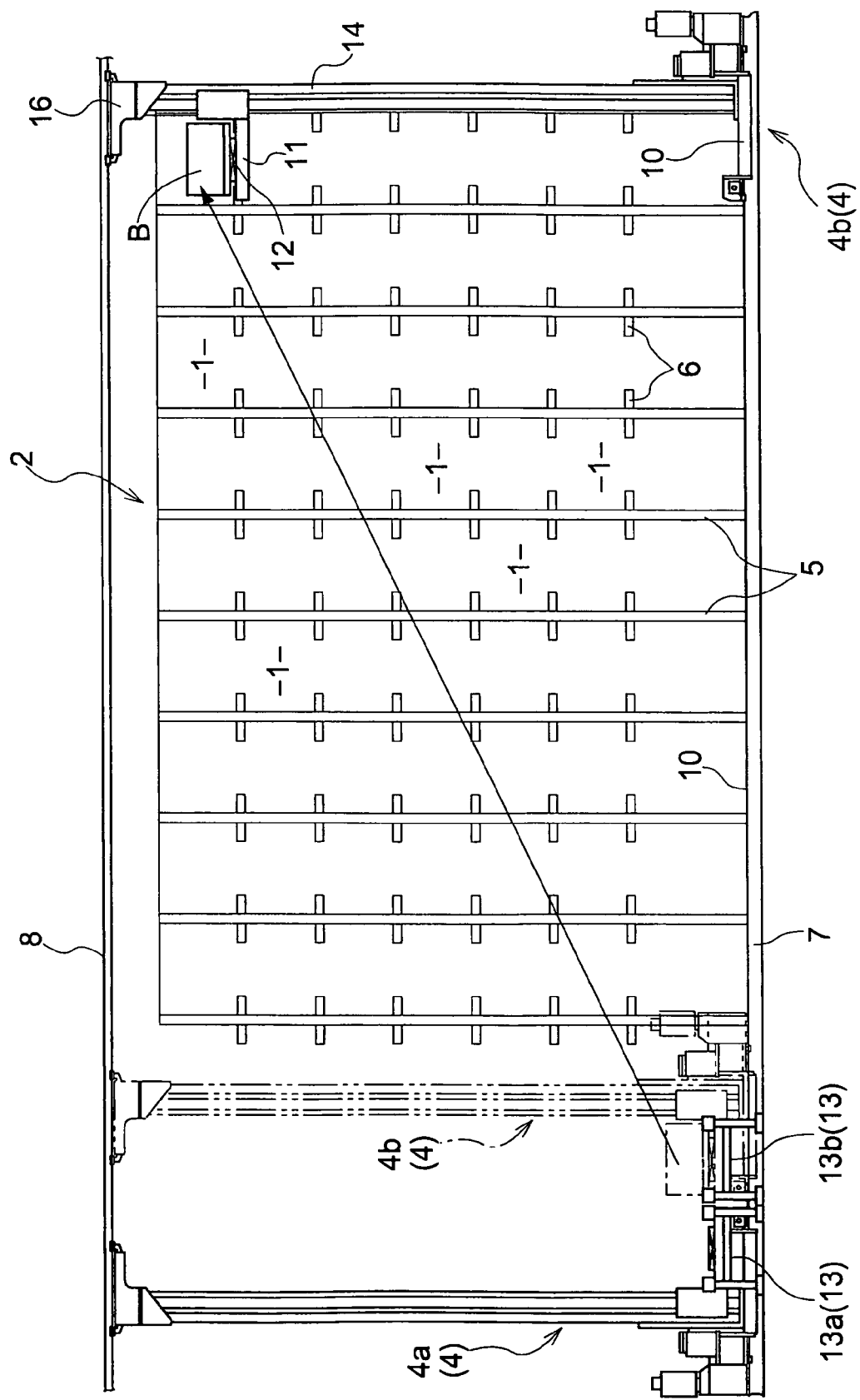

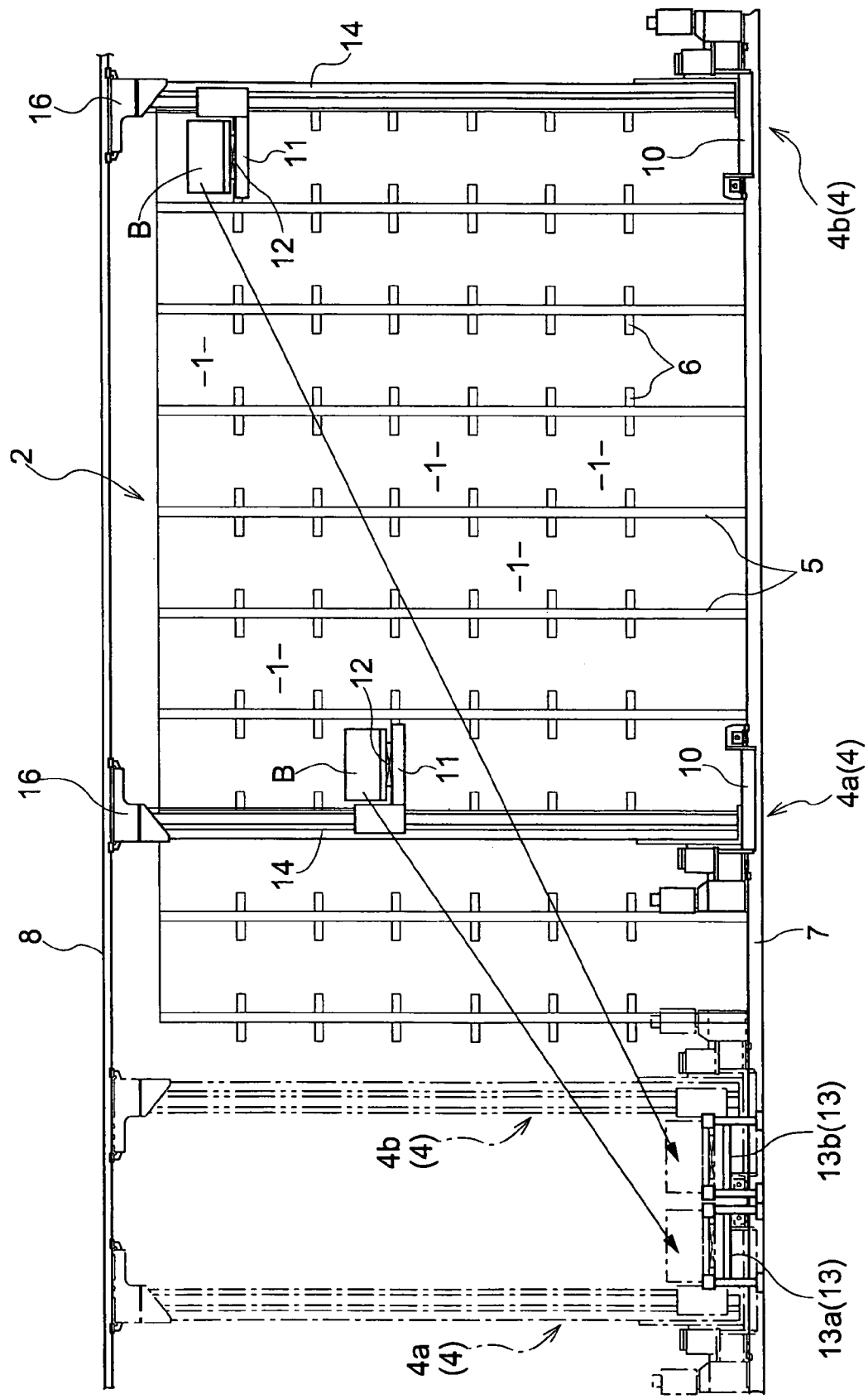
FIG.7 Simultaneous retrieval operation

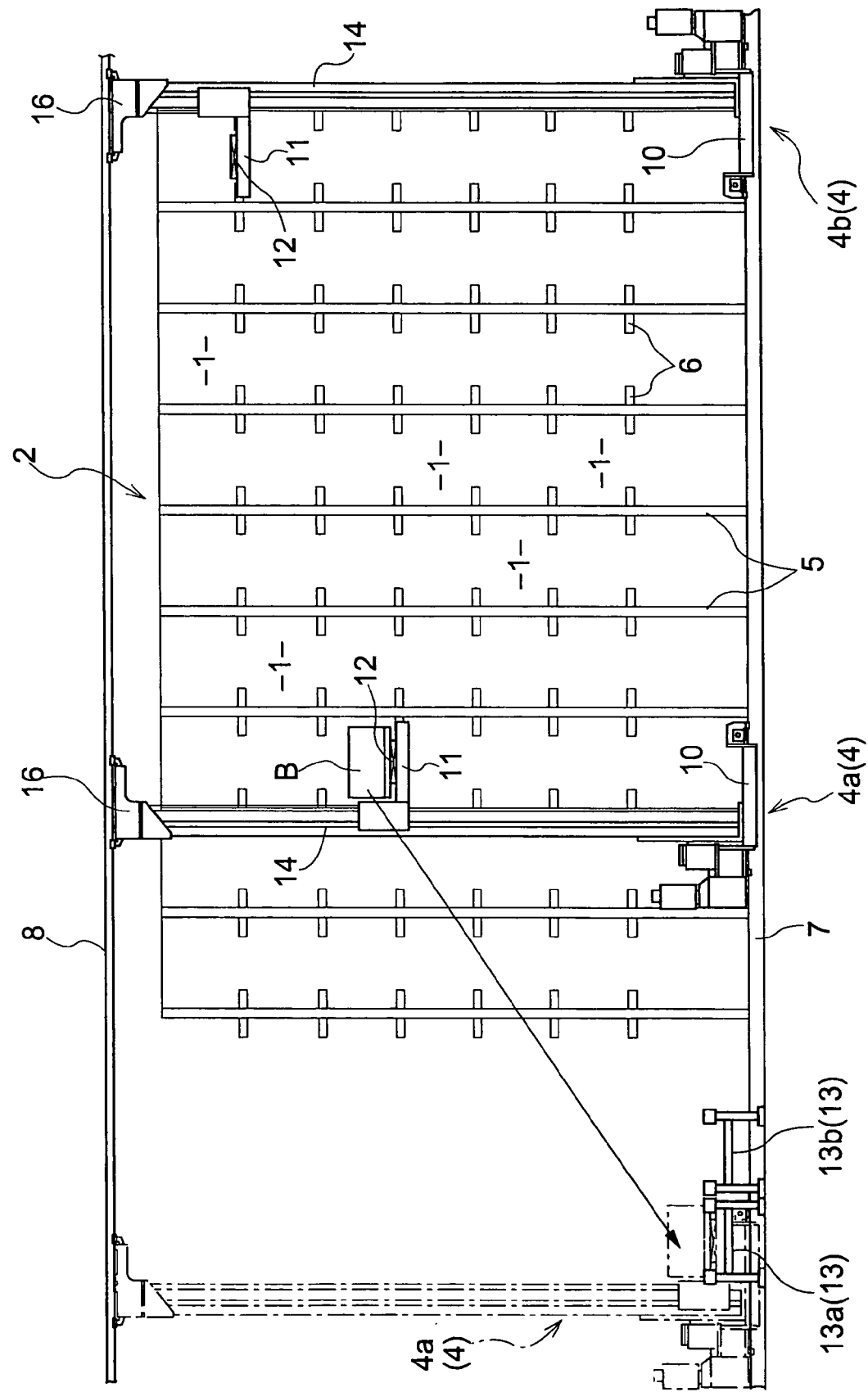

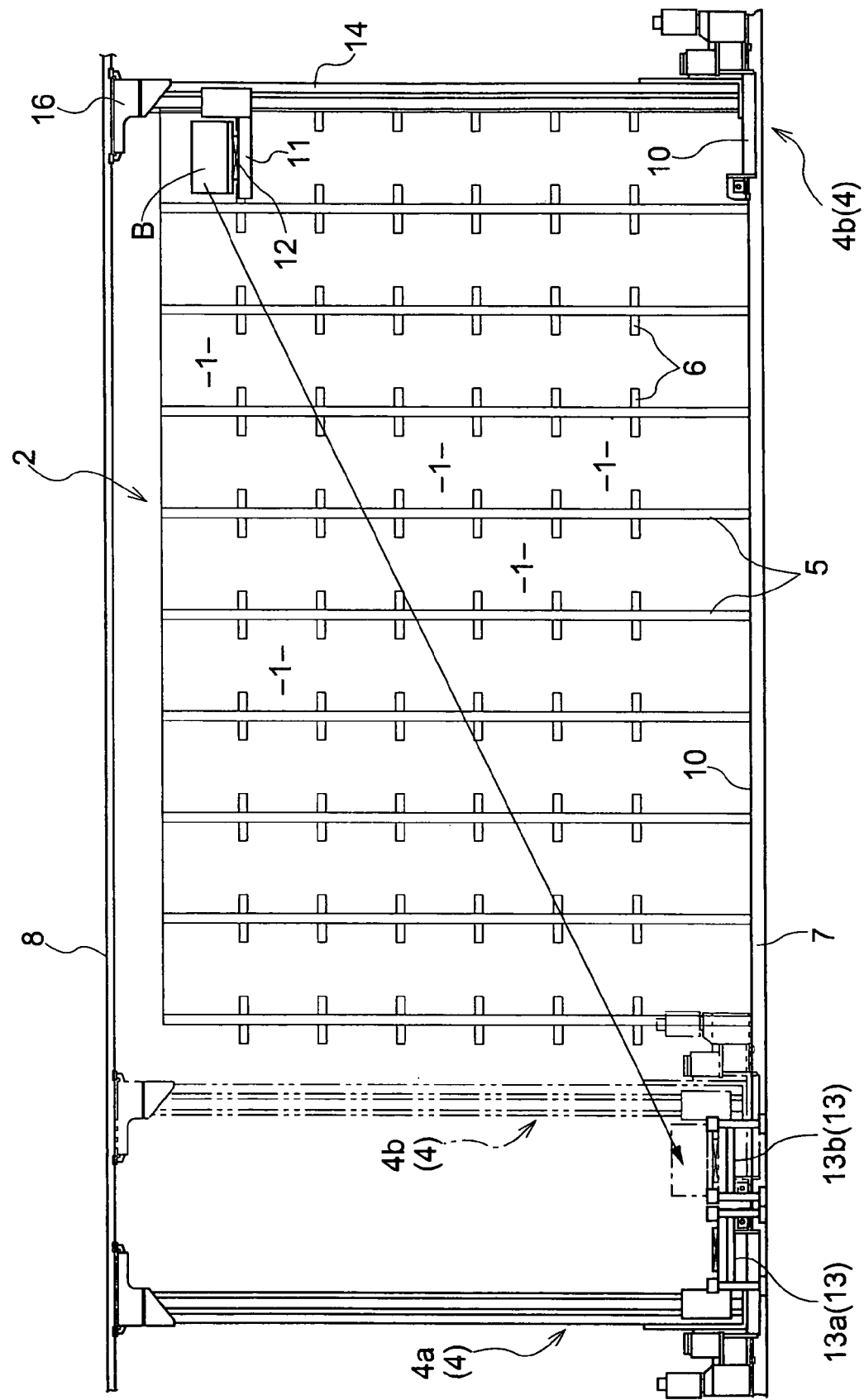
FIG. 9 Second individual retrieval operation

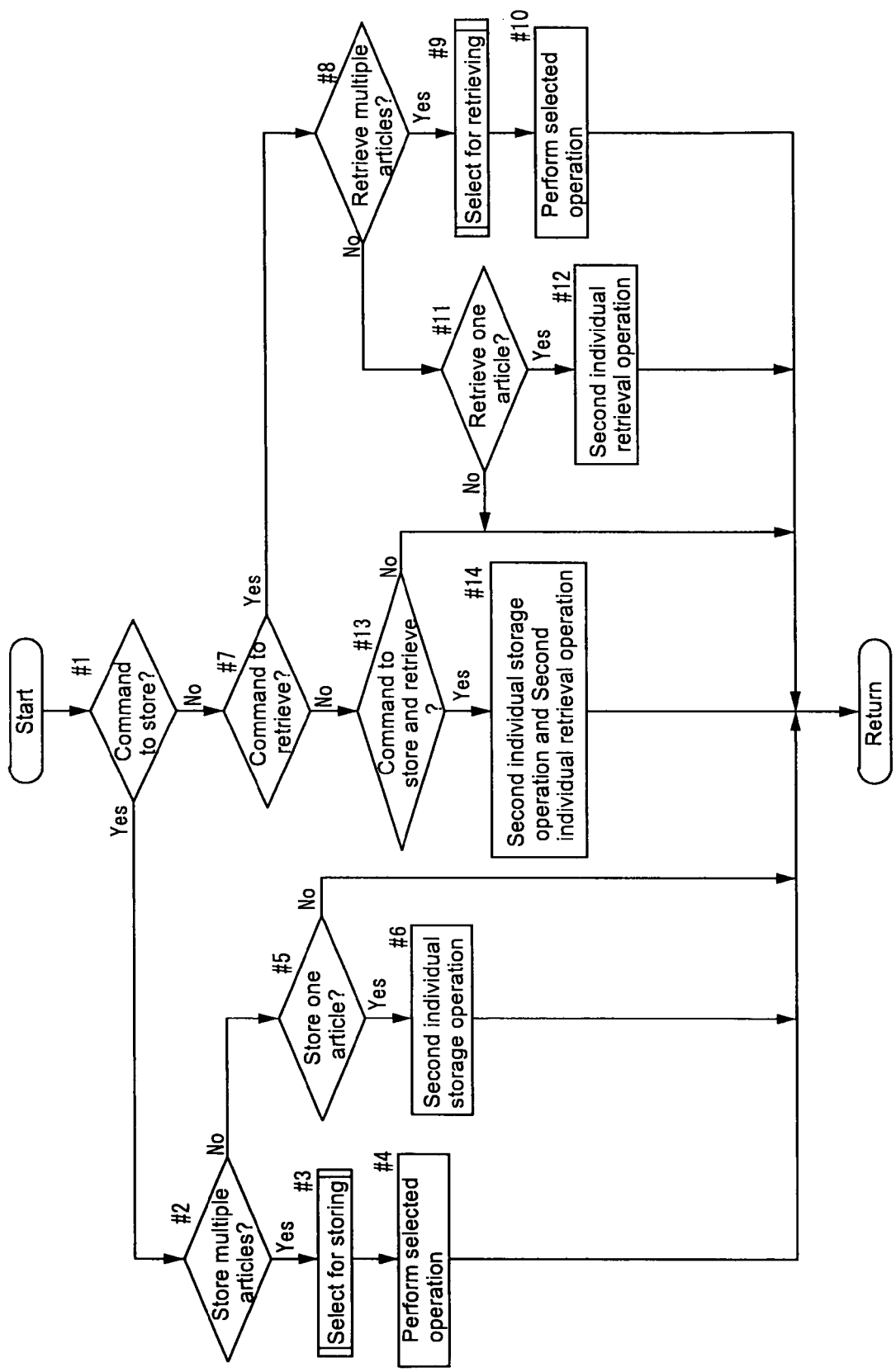

FIG.11

| Current Positions | | Command | | |
|---|---|---|---|---|
| First stacker crane | Second stacker crane | Storage of multiple articles | Retrieval of multiple articles | Storage and retrieval of articles |
| Article support | Article support | Simultaneous storage operation | Simultaneous retrieval operation | Second individual storage operation and second individual retrieval operation performed in sequence |
| Article support | Closer-side area of the article storage rack | Simultaneous storage operation | Simultaneous retrieval operation | Second individual storage operation and second individual retrieval operation performed in sequence |
| Article support | Further-side area of the article storage rack | First individual storage operations performed in sequence | First individual retrieval operations performed in sequence | Second individual storage operation and second individual retrieval operation performed in sequence |
| Closer-side area of the article storage rack | Closer-side area of the article storage rack | Simultaneous storage operation | Simultaneous retrieval operation | Second individual storage operation and second individual retrieval operation performed in sequence |
| Article storage rack | Further-side area of the article storage rack | First individual storage operations performed in sequence | First individual retrieval operations performed in sequence | Second individual storage operation and second individual retrieval operation performed in sequence |

FIG.12

| Current Positions | | Command | |
|---|---|---|---|
| First stacker crane | Second stacker crane | Storage of one article | Retrieval of one article |
| Article support | Article support | Second individual storage operation | Second individual retrieval operation |
| Article support | Article storage rack | Second individual storage operation | Second individual retrieval operation |
| Article storage rack | Article storage rack | Second individual storage operation | Second individual retrieval operation |

…

ARTICLE STORAGE FACILITY AND METHOD FOR OPERATING THE FACILITY

BACKGROUND OF THE INVENTION

1. Field of the Invention

The present invention relates to article storage facilities having a article storage rack and moving members such as stacker cranes for transporting articles between the article storage rack and article supports for articles transported in and out.

2. Description of Related Art

In such article storage facilities, it is required to improve the transport ability in order to shorten the time for storing and retrieving articles.

Thus, examples of conventional article storage facilities include a facility that is provided with a vertically movable unit that can be vertically moved with respect to an article-transporting moving member, wherein two article transfer means are aligned in the horizontal direction on the vertically movable unit (see JP 2000-229708A, for example).

In this first known structure, it is possible to transfer an article with each of the two article transfer means by horizontally moving the article-transporting moving member and by vertically moving the vertically movable unit, and thus it is possible to transport two articles at the same time with one article-transporting moving member, so that the transport efficiency can be improved.

Furthermore, in another conventional article storage facility, two article-transporting moving members are provided in such a manner that they horizontally move on the same track, two support portions for articles transported in and out are provided in such a manner that they are installed on both sides of an article storage rack, one article-transporting moving member among the two article-transporting moving members transports an article between one support portion for articles transported in and out and the article storage rack, and the other article-transporting moving member transports an article between the other support portion for articles transported in and out and the article storage rack (see JP 2002-175117A, for example).

In this second known structure, in the horizontal direction, a common area is provided at the middle portion of the article storage rack, and individual areas are provided on both ends of the common area. Either one of the two article-transporting moving members can enter the common area, but a restriction is performed such that the two article-transporting moving members do not enter the common area at the same time, and thus the article-transporting moving members are prevented from colliding against each other. In the two individual areas, the article-transporting moving members can transport articles at the same time, and thus the transport ability can be improved.

In the first known structure, the two pieces of article transfer means are aligned in the horizontal direction on the vertically movable unit. Thus, if a command to transport two articles to different storage portions among a plurality of storage portions in the article storage rack is given, or if a command to transport two articles from different storage portions among the plurality of storage portions in the article storage rack is given, then the articles are one by one transferred to and from the different storage portions.

More specifically, in a case where two articles are transported to different storage portions, when transferring the two articles to be stored in the different storage portions, first, one piece of article transfer means among the two pieces of article transfer means is positioned at an article transfer position on the rack side corresponding to the storage portion in which an article is to be stored, and the article is taken in by transferring it so as to be stored in the storage portion. Next, the other article transfer means is positioned at an article transfer position on the rack side corresponding to the storage portion in which the other article is to be stored, and the remaining one article is taken in by transferring it so as to be stored in the storage portion.

Accordingly, although two pieces of article transfer means are provided on one article-transporting moving member, the transport ability of only one piece of article transfer means can be obtained for transfer to and from the storage portions, and therefore there is the possibility that the transport ability cannot be effectively improved.

In the second known structure, although two article-transporting moving members are provided, the two article-transporting moving members cannot enter the common area of the article storage rack at the same time, and thus the two article-transporting moving members cannot transport articles at the same time in the common area. Accordingly, the transport ability of only one article-transporting moving member can be obtained for article transportation to and from a part of the article storage rack in the common area, and therefore there is the possibility that the transport ability cannot be effectively improved.

SUMMARY OF THE INVENTION

The present invention was arrived at in view of these problems, and it is an object thereof to provide an article storage facility in which the transport ability can be effectively improved.

To attain the object of the invention, the article storage facility in accordance with the present invention comprises:

an article storage rack having a plurality of storage units arranged in horizontal rows and vertical columns;

article supports arranged in a horizontal direction for use in storing articles into and retrieving articles from the article storage rack;

a plurality of moving members movable in a horizontal direction on a single predetermined path for transporting articles between the storage units and the article supports, wherein the plurality of moving members are adapted to be able to be at positions corresponding to the article supports such that the plurality of moving members can transfer articles from or to the corresponding article supports simultaneously;

transfer means provided to each of the plurality of moving members for transferring an article between the storage unit or the article support and the moving member;

control means for controlling operations of the moving members and the transfer means, wherein the control means controls horizontal movement of the moving members and the vertical movements of the transfer means in order to move the transfer means to rack side article transfer positions which correspond to each of the plurality of storage unit or to storage/retrieval transfer positions that correspond to the article supports, wherein the control means further controls transfer operations of the transfer means so that the transfer means can transfer articles from and to the storage units and the article supports at the rack side article transfer positions and storage/retrieval transfer positions respectively, and further wherein, in response to a storing command to store a plurality of articles to different storage units of the rack, the control means performs a multiple storing operation wherein the control means controls horizontal movements of the plurality of moving members, vertical movements of the plurality of transfer means provided to each of the plurality of moving members, and transfer operations of the plurality of transfer means in order to cause the plurality of the transfer means: a) to be at respective storage/retrieval positions; b) to receive articles from respective article supports; c) to move to rack side article transfer positions corresponding to the storage units in which the articles are to be stored and d) to transfer the received articles to the storage units.

In another embodiment, in response to a retrieving command to retrieve a plurality of articles from different storage units of the rack, the control means performs a multiple retrieval operation wherein the control means controls horizontal movements of the plurality of moving members, vertical movements of the plurality of transfer means provided to each of the plurality of moving members, and transfer operations of the plurality of transfer means in order to cause the plurality of the transfer means: a) to be at the rack side article transfer positions corresponding to the storage units from which the articles are to be retrieved; b) to transfer articles from respective article units; c) to move to corresponding article supports, and d) to transfer the retrieved articles to the article supports.

Thus, storing and retrieval operations of articles are made efficient by making more efficient use of a plurality of moving members.

BRIEF DESCRIPTION OF THE DRAWINGS

FIG. 3 is a block diagram of the article storage facility in the first embodiment.

FIG. 4 is a view showing the operation of the stacker cranes in a simultaneous storage operation (multiple storage operation).

FIG. 5 is a view showing the operation of the stacker cranes in a first individual storage operation.

FIG. 6 is a view showing the operation of the stacker cranes in a second individual storage operation.

FIG. 7 is a view showing the operation of the stacker cranes in a simultaneous retrieval operation (multiple retrieval operation).

FIG. 8 is a view showing the operation of the stacker cranes in a first individual retrieval operation.

FIG. 9 is a view showing the operation of the stacker cranes in a second individual retrieval operation.

FIG. 10 is a flowchart showing the control operation of control means.

FIG. 11 is a table indicating processes that are performed when commands to transport a plurality of articles in, to transport a plurality of articles out, and to transport articles in and out are given.

FIG. 12 is a table indicating processes that are performed when commands to transport one article in and to transport one article out are given.

DETAILED DESCRIPTION OF PREFERRED EMBODIMENTS

Embodiments of an article storage facility according to the present invention are described based on the drawings.

First Embodiment

Figure 1:
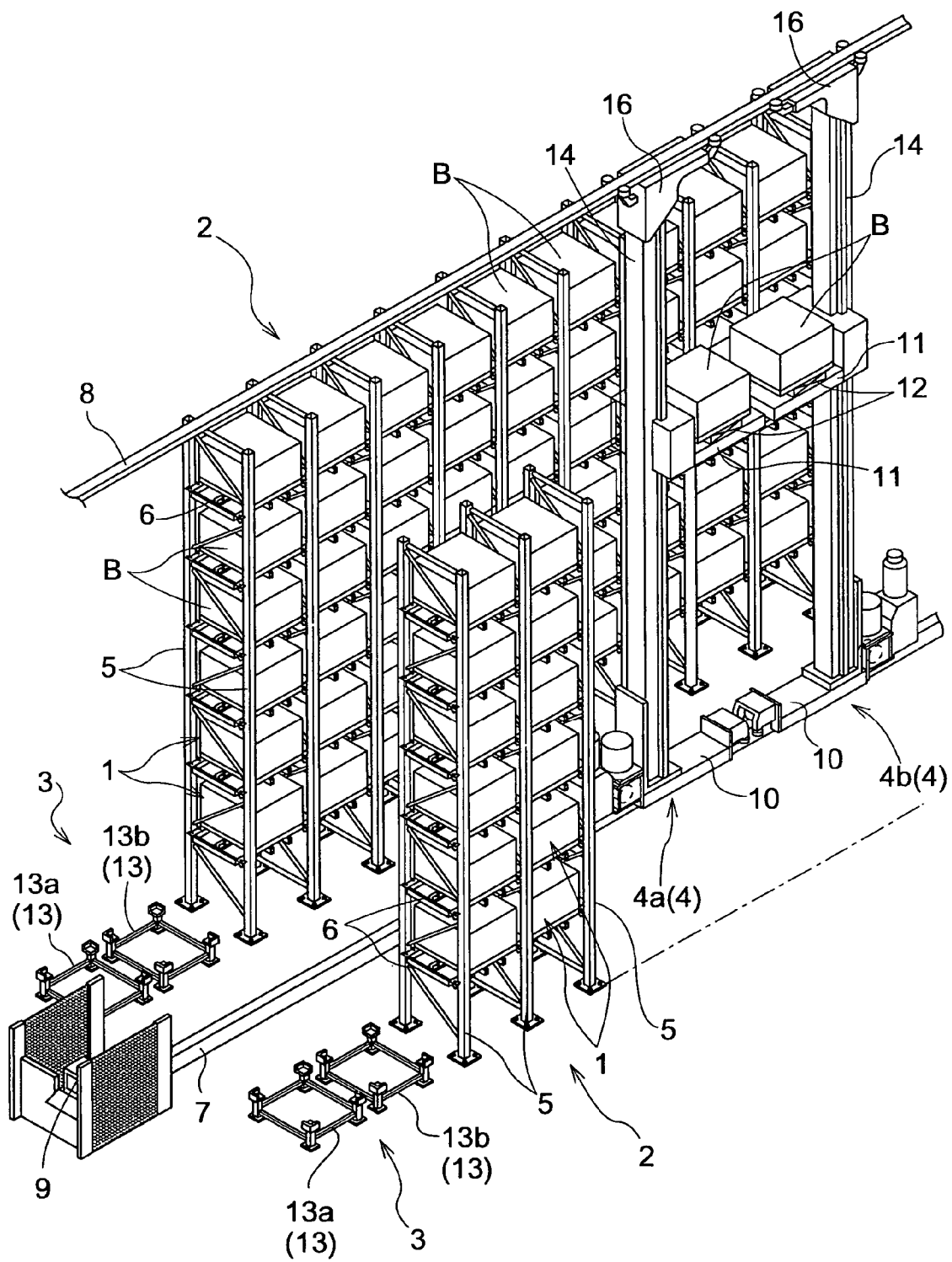
FIG. 1 is a perspective view of an article storage facility in a first embodiment.

First, an article storage facility in a first embodiment is described. As shown in FIG. 1, the article storage facility has article storage racks 2 in which a plurality of storage units 1 are aligned in the vertical direction and in the horizontal direction, and stacker cranes 4 as article-transporting moving members for transporting articles B between the article storage rack(s) 2 and article supports 3 where articles to be stored and retrieved articles are supported.

A plurality of pairs of front and rear support posts 5 are arranged upright with spacings interposed therebetween in the horizontal direction in the article storage racks 2, and a plurality of placing support portions 6 that extend in the horizontal direction are arranged with spacings interposed therebetween in the vertical direction on each pair of front and rear support posts 5.

One storage unit 1 is constituted by the pair of front and rear support posts 5 and the pair of left and right placing support portions 6, and the plurality of storage units 1 are aligned in the vertical direction and in the horizontal direction.

Two article storage racks 2 are installed with a spacing interposed therebetween such that their directions in which articles are taken in and out are opposed to each other, and two article supports 3 are installed so as to be opposed to each other with a spacing interposed therebetween at the location adjacent to the article storage racks 2 in the horizontal direction, such as the location on the side of the article storage racks 2.

A travel rail 7 as a predetermined path or track extends the entire length of the article storage racks 2 in the horizontal direction and the article supports 3 is installed on the floor face between the two article storage racks 2, and a guide rail 8 extending across the entire area of the article storage racks 2 in the horizontal direction and the article supports 3 is installed on the upper side. Furthermore, the stacker cranes 4 are provided so as to horizontally move on the travel rail 7 while being guided by the guide rail 8.

The end portion, among both end portions of the travel rail 7, on the side of the article supports 3 is provided with a ground-side controller 9 for managing the operation of the stacker cranes 4. The ground-side controller 9 manages storage information indicating, for example, which article is stored in which storage unit 1. In the present description, the expressions a controller, a controlling device, controlling portion represents a device that has a CPU, memory, and other necessary components such as a communication circuit for controlling various devices. The various control portions may represent a part of an algorism or functions of the algorism carried out by such a controlling device or devices. All of the controlling functions may be performed by one controlling unit or may be performed by separate controlling units.

Figure 2:
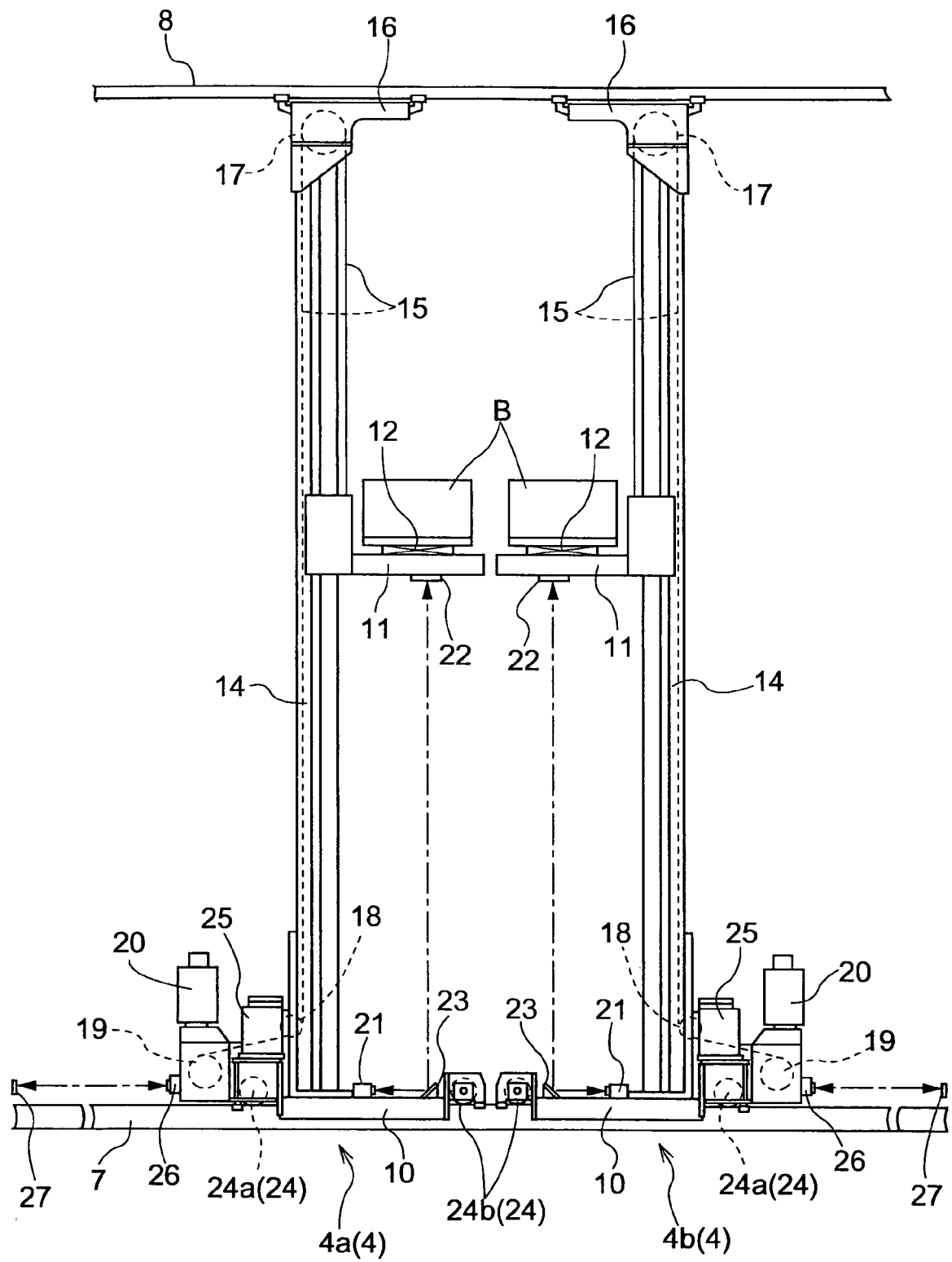
FIG. 2 is a side view of stacker cranes in the first embodiment.

Two stacker cranes 4 are provided in such a manner that they horizontally move on the same travel rail 7. As shown in FIG. 2, each of the two stacker cranes 4 is constituted by a horizontally movable travel vehicle 10 that travels along the travel rail 7, a vertically movable unit 11 that can be vertically moved with respect to the travel vehicle 10, and a transfer apparatus 12 (such as a fork-type transfer apparatus) as article transfer means that is provided on the vertically movable unit 11. Any one of various known transfer apparatus may be employed for the purposes of the present invention other than the fork-type transfer apparatus where two pairs of arms extend telescopically from the vertically moving unit by means of driving chains. One disclosed in US Patent Application Publication 2005/0036858A1 may be employed, which application is incorporated herein by reference.

The stacker cranes 4 are configured so as to perform a storage operation in which the articles B present at the article supports 3 are put in the storage units 1 of the article storage racks 2, or to perform a retrieval operation in which the articles B that are stored in the storage units 1 of the article storage racks 2 are taken out to the article supports 3, by horizontally moving the travel vehicles 10, by vertically moving the vertically movable units 11, and by letting the transfer apparatuses 12 perform a transferring operation.

As shown in FIG. 1, as the article supports 3, two article receiving platforms 13 on which the articles B are placed are provided in such a manner that they are aligned in the horizontal movement direction of the stacker cranes 4. In this manner, the article supports 3 are configured such that the articles B can be transferred between the article receiving platforms 13 and the transfer apparatuses 12 that are respectively provided on the two stacker cranes 4 when the stacker cranes 4 are aligned in the horizontal movement direction.

In the first embodiment, among the two stacker cranes 4, one positioned closer the article supports 3 is referred to as a first stacker crane 4a, and the other positioned on the side of the article storage racks 2 is referred to as a second stacker crane 4b.

Among the two article receiving platforms 13, one positioned on the side away from the article storage racks 2 is referred to as a first article receiving platform 13a, and the other positioned on the side closer to the article storage racks 2 is referred to as a second article receiving platform 13b.

The first stacker crane 4a transports an article between the first article receiving platform 13a and the article storage racks 2, and the second stacker crane 4b transports an article between the second article receiving platform 13b and the article storage racks 2.

A single vertical post (mast) 14 for guiding and supporting the vertically movable unit 11 such that it can be vertically moved is disposed upright on the travel vehicle 10, and the vertical post 14 is disposed upright on the opposite side of the position of the other stacker crane 4 in the horizontal movement direction of the stacker cranes 4, that is in a region substantially spaced apart from the end closer to the other stacker crane.

The vertically movable unit 11 is suspended and guided by an elevation chain 15, and the elevation chain 15 is wound over a guide sprocket 17 that is provided on an upper frame 16 guided along the guide rail 8 and a guide sprocket 18 that is provided on the lower side of the vertical post 14, and is connected to a take-up drum 19 that is mounted on one end of the travel vehicle 10.

A motor 20 for elevation of an inverter-type drives the take-up drum 19 to rotate forward and in reverse, so that the elevation chain 15 is reeled off and wound up, thereby vertically moving the vertically movable unit 11. Other conventional device, including a use of a motor mounted to the vertically movable unit 11 to rotate a gear that engages with engaging teeth provided to the vertical post 14, may be used for the purpose of vertically moving the vertically movable unit 11.

The travel vehicle 10 is provided with a laser vertical range finder 21 for emitting a light beam for measuring the distance in the horizontal direction, and a mirror 23 for bending the path of the light beam emitted by the laser vertical range finder 21 upward in the vertical direction and projecting the light beam on a reflection plate 22 that is installed on the lower face of the vertically movable unit 11.

The laser vertical range finder 21 is configured so as to detect the vertical position of the vertically movable unit 11 on the vertical route, by taking the arrangement position of the mirror 23 provided on the travel vehicle 10 as a reference position in the vertical direction of the vertically movable unit 11, and by detecting the distance between the reference position and the vertically movable unit 11.

Furthermore, the travel vehicle 10 is provided with two front and rear wheels 24 that can travel on the travel rail 7. Among the two wheels 24, one wheel on one end side in the horizontal movement direction is configured as a driving wheel 24a that is driven by an electric travel motor 25 of an inverter-type, and the other wheel on the other side in the horizontal movement direction is configured as a driven wheel 24b that can freely rotate.

The travel vehicle 10 is horizontally moved by driving the driving wheel 24a to rotate forward and in reverse with the electric travel motor 25.

The travel vehicle 10 is provided with a laser horizontal range finder 26 for emitting a light beam for measuring the distance in the horizontal direction, and a reflection plate 27 for reflecting the light beam from the laser horizontal range finder 26 is provided at each of both end portions of the travel rail 7.

The laser horizontal range finder 26 is configured so as to detect the horizontal position of the travel vehicle 10 on the horizontal route, by emitting a light beam toward the reflection plate 27 that is installed on the ground side, thereby detecting the distance of the travel vehicle 10 from the end portions of the travel rail 7.

As shown in FIG. 3, each of the two stacker cranes 4 is provided with a crane control device 28 for controlling the operation of the stacker crane 4, and information detected by the laser vertical range finder 21 and information detected by the laser horizontal range finder 26 are input to the crane control device 28.

The configuration of a first crane control device 28A in the first stacker crane 4a is similar to that of a second crane control device 28B in the second stacker crane 4b.

The crane control device 28 is configured so as to control the horizontal movement of the travel vehicle 10 and the vertical movement of the vertically movable unit 11 such that the transfer apparatus 12 is moved to article transfer positions on the rack side respectively corresponding to the plurality of storage units 1 and an article transfer position on the storage/retrieval side corresponding to the article support 3, and so as to control the transferring operation of the transfer apparatus 12 such that the transfer apparatus 12 transfers an article to and from the storage units 1 and the article support 3 at the article transfer positions on the rack side and the article transfer position on the storage/retrieval side.

Describing more specifically, each of the article transfer positions on the rack side and the article transfer position on the storage/retrieval side is a position that is determined by a target vertical stop position and a target horizontal stop position. The article transfer position on the storage/retrieval side is determined for each of the two article receiving platforms 13, and the target vertical stop position and the target horizontal stop position are set for each of the two article receiving platforms 13. The article transfer positions on the rack side are determined respectively for the plurality of storage units 1, and the target vertical stop position and the target horizontal stop position are set for each of the plurality of storage units 1.

The crane control device 28 is constituted by, for example, a horizontal movement control portion 28a for controlling horizontal movement, in which the horizontal movement of the travel vehicle 10 is controlled such that the travel vehicle 10 is traveled to the target horizontal stop position specified by the command, based on information detected by the laser horizontal range finder 26, a vertical movement control portion 28b for controlling vertical movement, in which the vertical movement of the vertically movable unit 11 is controlled such that the vertically movable unit 11 is vertically moved to the target vertical stop position specified by the command, based on information detected by the laser vertical range finder 21, and a transferring operation control portion 28c for controlling transferring operation, in which the transferring operation of the transfer apparatus 12 is controlled such that an article is on the side of the storage units 1 and the article support 3.

In the control on the horizontal movement by the horizontal movement control portion 28a, the operation of the electric travel motor 25 is controlled such that the horizontal movement of the travel vehicle 10 is started by starting the operation of the electric travel motor 25, and when the horizontal position of the travel vehicle 10 that is detected by the laser horizontal range finder 26 reaches the target horizontal stop position specified by the command, the travel vehicle 10 is stopped at the target horizontal stop position by applying the brake thereon by stopping the operation of the electric travel motor 25.

In the control on the vertical movement by the vertical movement control portion 28b, the operation of the motor 20 for elevation is controlled such that the vertical movement of the vertically movable unit 11 is started by starting the operation of the motor 20 for elevation, and when the vertical position of the vertically movable unit 11 that is detected by the laser vertical range finder 21 reaches the target vertical stop position specified by the command, the vertically movable unit 11 is stopped at the target vertical stop position by applying the brake thereon by stopping the operation of the motor 20 for elevation.

In the control on the transferring operation by the transferring operation control portion 28c, the transferring operation of the transfer apparatus 12 is controlled such that by operating the transfer apparatus 12 of a fork-type, the fork is projected to scooping up the article B or putting down the article B, and then the fork is withdrawn.

Various types of information can be communicated between the crane control devices 28 and the ground-side controller 9. Various commands are given by the ground-side controller 9 to the two crane control devices 28, namely the first crane control device 28A and the second crane control device 28B.

The crane control devices 28 perform a storage operation in which the articles B present at the article supports 3 are put in the storage units 1 of the article storage racks 2, or to perform a retrieval operation in which the articles B that are stored in the storage units 1 of the article storage racks 2 are taken out to the article supports 3, by performing the control on the horizontal movement by the horizontal movement control portion 28a, the control on the vertical movement by the vertical movement control portion 28b, and the control on the transferring operation by the transferring operation control portion 28c based on the commands from the ground-side controller 9.

Control means H for controlling the operation of the plurality of stacker cranes 4 in this manner is constituted by the ground-side controller 9 and the two crane control devices 28.

Processes that can be performed by the control means H are described.

The control means H can perform three types of storage operations, which are a simultaneous storage operation (multiple storage operation), a first individual storage operation, and a second individual storage operation, as storage operations, and can perform three types of retrieval operations, which are a simultaneous retrieval operation (multiple retrieval operation), a first individual retrieval operation, and a second individual retrieval operation, as retrieval operations.

Hereinafter, each of the processes is described based on FIGS. 4 to 9.

FIGS. 4 to 9 are partially omitted side views of the article storage facility, in which the article supports 3 are positioned on the left end, and the article storage racks 2 are positioned on the right side of the article supports 3.

First, the simultaneous storage operation is described based on FIG. 4. The simultaneous storage operation is a storage operation that is performed by the two stacker cranes 4, namely the first stacker crane 4a and the second stacker crane 4b.

It should be noted that when the simultaneous storage operation (multiple storage operation) is performed, the articles B are placed on both the first article receiving platform 13a and the second article receiving platform 13b, and, among the two articles B, the article B that is to be stored on the further side into the article storage racks 2 is placed on the second article receiving platform 13b.

The control means H controls the horizontal movement of the first stacker crane 4a and the second stacker crane 4b, the vertical movement of the two transfer apparatuses 12, and the transferring operation of the two transfer apparatuses 12 such that receiving transfer is performed in which as indicated by the broken lines in the drawing, the two transfer apparatuses 12 that are respectively provided on the first stacker crane 4a and the second stacker crane 4b are positioned at the article transfer positions on the storage/retrieval side, and the articles B are received by the two transfer apparatuses 12 from the article supports 3, and then transfer is performed in which as indicated by the solid lines in the drawing, the two transfer apparatuses 12 that are respectively provided on the first stacker crane 4a and the second stacker crane 4b are positioned at the article transfer positions on the rack side corresponding to the storage units 1 in which the received articles B are to be stored in the article storage racks 2, and the received articles B are put in the storage units 1.

Describing more specifically, the ground-side controller 9 gives storing commands to both the first crane control device 28A in the first stacker crane 4a and the second crane control device 28B in the second stacker crane 4b.

The storing command to the first crane control device 28A is a command to put, in the storage unit 1, the article B that is placed on the first article receiving platform 13a, and the target vertical stop positions and the target horizontal stop positions with respect to the article transfer position on the storage/retrieval side corresponding to the first article receiving platform 13a and the article transfer position on the rack side corresponding to the storage unit 1 in which the article B is to be stored are specified by the command.

The storing command to the second crane control device 28B is a command to put, in the storage unit 1, the article B that is placed on the second article receiving platform 13b, and the target vertical stop positions and the target horizontal stop positions with respect to the article transfer position on the storage/retrieval side corresponding to the second article receiving platform 13b and the article transfer position on the rack side corresponding to the storage unit 1 in which the article B is to be stored are specified by the command.

The commands are given such that with respect to the storage units 1 in which the articles B are to be stored, the storage unit 1 specified by the storing command to the first crane control device 28A is closer than the storage unit 1 specified by the storing command to the second crane control device 28B, to the article supports 3 in the horizontal movement direction of the stacker cranes 4.

The first crane control device 28A and the second crane control device 28B are configured so as to perform basically the same processes although the article receiving platforms 13 from which the articles B are received and the storage units 1 in which the articles B are to be stored are different therebetween.

In the first crane control device 28A, first, control on the horizontal movement by the horizontal movement control portion 28a, control on the vertical movement by the vertical movement control portion 28b, and control on the transferring operation by the transferring operation control portion 28c are performed such that the first stacker crane 4a receives the article B that is placed on the first article receiving platform 13a. Next, control on the horizontal movement by the horizontal movement control portion 28a, control on the vertical movement by the vertical movement control portion 28b, and control on the transferring operation by the transferring operation control portion 28c are performed such that the first stacker crane 4a puts the received article B in the storage unit 1 in which the article is to be stored.

In the second crane control device 28B, control on the horizontal movement by the horizontal movement control portion 28a, control on the vertical movement by the vertical movement control portion 28b, and control on the transferring operation by the transferring operation control portion 28c are performed such that the second stacker crane 4b receives the article B that is placed on the second article receiving platform 13b, and then the second stacker crane 4b puts the received article B in the storage unit 1 in which the article is to be stored.

A simultaneous or multiple storage operation may be performed follows. The first end in the following is the end of the rack closer to the article support or article receiving platforms. The second end is the far end of the rack opposite from the article receiving platforms.

1) placing a first article, to be stored in a first storage unit in a first column closer to the first end, on the first article support;
2) placing a second article, to be stored in a second storage unit in a second column closer to the second end, on the second article support;
3) locating the first vehicle at a position corresponding to the first article support;
4) locating the second vehicle at a position corresponding to the second article support;
5) operating the transfer apparatus of the first vehicle to have the first article supported on the first vehicle;
6) operating the transfer apparatus of the second vehicle to have the second article supported on the second vehicle;
7) causing the second vehicle to move to the second column;
8) causing the first vehicle to move to the first column;
9) causing the vertically moving unit of the second vehicle to move to a position corresponding to the second storage unit before, during, or after the step of causing the second vehicle to move to the second column;
10) causing the vertically moving unit of the first vehicle to move to a position corresponding to the first storage unit before, during, or after the step of causing the first vehicle to move to the first column;
11) operating the transfer apparatus of the second vehicle to transfer the second article to the second storage unit;
12) operating the transfer apparatus of the first vehicle to transfer the first article to the first storage unit.

Although numbers are provided above for clarity, they do not necessarily represent the order in which the steps are carried out.

Next, the first individual storage operation is described based on FIG. 5. The first individual storage operation is a storage operation that is performed by the first stacker crane 4a, which is the stacker crane 4 positioned on the side of the article supports 3, among the two stacker cranes 4.

The control means H controls the horizontal movement of the first stacker crane 4a, the vertical movement of the transfer apparatus 12, and the transferring operation of the transfer apparatus 12 such that by operating the first stacker crane 4a, receiving transfer is performed in which the transfer apparatus 12 that is provided on the first stacker crane 4a is positioned at the article transfer position on the storage/retrieval side corresponding to the support portion for articles transported in and out, and the article B is received by the transfer apparatus 12 from the support portion for articles transported in and out, and then transfer is performed in which the transfer apparatus 12 that is provided on the first stacker crane 4a is positioned at the article transfer position on the rack side corresponding to the storage unit 1 in which the received article B is to be stored in the article storage racks 2, and the received article B is put in the storage unit 1.

Describing more specifically, the ground-side controller 9 gives a storing command to the first crane control device 28A, and gives a standby command to the second crane control device 28B. The standby command is a command to put the second stacker crane 4b on standby at that position.

In the first crane control device 28A, control on the horizontal movement by the horizontal movement control portion 28a, control on the vertical movement by the vertical movement control portion 28b, and control on the transferring operation by the transferring operation control portion 28c are performed such that first, the first stacker crane 4a receives the article B that is placed on the first article receiving platform 13a, and then the first stacker crane 4a puts the received article B in the storage unit 1 in which the article is to be stored.

In the second crane control device 28B, the second stacker crane 4b is put on standby at that position without performing control on the horizontal movement by the horizontal movement control portion 28a, control on the vertical movement by the vertical movement control portion 28b, nor control on the transferring operation by the transferring operation control portion 28c.

Next, the second individual storage operation is described based on FIG. 6. The second individual storage operation is a storage operation that is performed by the second stacker crane 4b, which is the stacker crane 4 positioned on the side of the article storage racks 2, among the two stacker cranes 4.

The control means H controls the horizontal movement of the second stacker crane 4b, the vertical movement of the transfer apparatus 12, and the transferring operation of the transfer apparatus 12 such that by operating the second stacker crane 4b, receiving transfer is performed in which the transfer apparatus 12 that is provided on the second stacker crane 4b is positioned at the article transfer position on the storage/retrieval side corresponding to the support portion for articles transported in and out, and the article B is received by the transfer apparatus 12 from the support portion for articles transported in and out, and then transfer is performed in which the transfer apparatus 12 that is provided on the second stacker crane 4b is positioned at the article transfer position on the rack side corresponding to the storage unit 1 in which the received article B is to be stored in the article storage racks 2, and the received article B is put in the storage unit 1.

Describing more specifically, the ground-side controller 9 gives an HP standby command to the first crane control device 28A, and gives a storing command to the second crane control device 28B in the second stacker crane 4b. The HP standby command is a command to put the first stacker crane 4a on standby in a state where the transfer apparatus 12 that is provided on the first stacker crane 4a is positioned at the article transfer position on the storage/retrieval side, and the target vertical stop position and the target horizontal stop position with respect to the article transfer position on the storage/retrieval side corresponding to the first article receiving platform 13a are specified by the command.

In the first crane control device 28A, control on the horizontal movement by the horizontal movement control portion 28a and control on the vertical movement by the vertical movement control portion 28b are performed such that the transfer apparatus 12 that is provided on the first stacker crane 4a is positioned at the article transfer position on the storage/retrieval side corresponding to the first article receiving platform 13a.

In the second crane control device 28B, control on the horizontal movement by the horizontal movement control portion 28a, control on the vertical movement by the vertical movement control portion 28b, and control on the transferring operation by the transferring operation control portion 28c are performed such that first, the second stacker crane 4b receives the article B that is placed on the second article receiving platform 13b, and then the second stacker crane 4b puts the received article B in the storage unit 1 in which the article is to be stored.

Next, the simultaneous retrieval operation (multiple retrieval operation) is described based on FIG. 7. The simultaneous retrieval operation is a retrieval operation that is performed by the two stacker cranes 4, namely the first stacker crane 4a and the second stacker crane 4b.

The control means H controls the horizontal movement of the first stacker crane 4a and the second stacker crane 4b, the vertical movement of the two transfer apparatuses 12, and the transferring operation of the two transfer apparatuses 12 such that take-out transfer is performed in which the two transfer apparatuses 12 that are respectively provided on the first stacker crane 4a and the second stacker crane 4b are positioned at the article transfer positions on the rack side corresponding to the storage units 1 from which articles are to be taken out in the article storage racks 2, and the articles B are taken out of the storage units 1 by the plurality of transfer apparatus 12, and then the two transfer apparatuses 12 that are respectively provided on the first stacker crane 4a and the second stacker crane 4b are positioned at the article transfer positions on the storage/retrieval side corresponding to the article supports 3, and the taken out articles B are transferred to the article supports 3.

Describing more specifically, the ground-side controller 9 gives retrieval commands to both the first crane control device 28A and the second crane control device 28B.

The retrieval command to the first crane control device 28A is a command to take out, to the first article receiving platform 13a, the article B that is stored in the storage unit 1, and the target vertical stop positions and the target horizontal stop positions with respect to the article transfer position on the rack side corresponding to the storage unit 1 from which the article B is to be taken out and the article transfer position on the storage/retrieval side corresponding to the first article receiving platform 13a are specified by the command.

The retrieval command to the second crane control device 28B is a command to take out, to the second article receiving platform 13b, the article B that is stored in the storage unit 1, and the target vertical stop positions and the target horizontal stop positions with respect to the article transfer position on the rack side corresponding to the storage unit 1 from which the article B is to be taken out and the article transfer position on the storage/retrieval side corresponding to the second article receiving platform 13b are specified by the command.

The commands are given such that with respect to the storage units 1 from which the articles B are to be taken out, the storage unit 1 specified by the retrieval command to the first crane control device 28A is closer than the storage unit 1 specified by the retrieval command to the second crane control device 28B, to the article supports 3 in the horizontal movement direction of the stacker cranes 4.

The first crane control device 28A and the second crane control device 28B are configured so as to perform basically the same processes although the storage units 1 from which the articles B are to be taken out and the article receiving platforms 13 to which the taken out articles B are transferred are different therebetween.

In the first crane control device 28A, first, control on the horizontal movement by the horizontal movement control portion 28a, control on the vertical movement by the vertical movement control portion 28b, and control on the transferring operation by the transferring operation control portion 28c are performed such that the first stacker crane 4a takes out the article B that is stored in the storage unit 1. Next, control on the horizontal movement by the horizontal movement control portion 28a, control on the vertical movement by the vertical movement control portion 28b, and control on the transferring operation by the transferring operation control portion 28c are performed such that the first stacker crane 4a transfers the taken out article B to the first article receiving platform 13a.

In the second crane control device 28B, control on the horizontal movement by the horizontal movement control portion 28a, control on the vertical movement by the vertical movement control portion 28b, and control on the transferring operation by the transferring operation control portion 28c are performed such that the second stacker crane 4b takes out the article B that is stored in the storage unit 1 different in the horizontal movement direction of the travel vehicles 10, and then the second stacker crane 4b transfers the taken out article B to the second article receiving platform 13b.

A simultaneous or multiple retrieval operation may be carried out as follows. The first end in the following is the end of the rack closer to the article support or article receiving platforms. The second end is the far end of the rack opposite from the article receiving platforms.

1) causing the second vehicle to move to a second column, that is closer to the second end than a first column is to the second end, in which a target second storage unit belongs;
2) causing the first vehicle to move to a first column, that is closer to the first end than the second column is to the first end, in which a target first storage unit belongs;
3) causing the vertically movable unit of the second vehicle to move to a position corresponding to the second storage unit before, during, or after the step of causing the second vehicle to move to the second column;
4) causing the vertically movable unit of the first vehicle to move to a position corresponding to the first storage unit before, during, or after the step of causing the first vehicle to move to the first column;
5) operating the transfer apparatus of the second vehicle to transfer a second article in the second storage unit to the second vehicle;
6) operating the transfer apparatus of the first vehicle to transfer a first article in the first storage unit to the first vehicle;
7) causing the second vehicle to move to a position corresponding to the second article support;
8) causing the first vehicle to move to a position corresponding to the first article support;
9) operating the transfer apparatus of the second vehicle to have the second article supported on the second article support;
10) operating the transfer apparatus of the first vehicle to have the first article supported on the first article support.

Although the numbers are provided above for clarity, they do not necessarily represent the order in which the steps are carried out.

Next, the first individual retrieval operation is described based on FIG. 8. The first individual retrieval operation is a retrieval operation that is performed by the first stacker crane 4a.

The control means H controls the horizontal movement of the first stacker crane 4a, the vertical movement of the transfer apparatus 12, and the transferring operation of the transfer apparatus 12 such that by operating the first stacker crane 4a, take-out transfer is performed in which the transfer apparatus 12 that is provided on the first stacker crane 4a is positioned at the article transfer position on the rack side corresponding to the storage unit 1 from which an article is to be taken out in the article storage racks 2, and the article B is taken out of the storage unit 1 by the transfer apparatus 12, and then the transfer apparatus 12 that is provided on the first stacker crane 4a is positioned at the article transfer position on the storage/retrieval side corresponding to the article support 3, and the taken out article B is transferred to the article support 3.

Describing more specifically, the ground-side controller 9 gives a retrieval command to the first crane control device 28A, and gives a standby command to the second crane control device 28B.

In the first crane control device 28A, control on the horizontal movement by the horizontal movement control portion 28a, control on the vertical movement by the vertical movement control portion 28b, and control on the transferring operation by the transferring operation control portion 28c are performed such that first, the first stacker crane 4a takes out the article B that is stored in the storage unit 1, and then the first stacker crane 4a transfers the taken out article B to the first article receiving platform 13a.

In the second crane control device 28B, the second stacker crane 4b is put on standby at that position without performing control on the horizontal movement by the horizontal movement control portion 28a, control on the vertical movement by the vertical movement control portion 28b, nor control on the transferring operation by the transferring operation control portion 28c.

Next, the second individual retrieval operation is described based on FIG. 9. The second individual retrieval operation is a retrieval operation that is performed by the second stacker crane 4b.

The control means H controls the horizontal movement of the second stacker crane 4b, the vertical movement of the transfer apparatus 12, and the transferring operation of the transfer apparatus 12 such that by operating the second stacker crane 4b, take-out transfer is performed in which the transfer apparatus 12 that is provided on the second stacker crane 4b is positioned at the article transfer position on the rack side corresponding to the storage unit 1 from which an article is to be taken out in the article storage racks 2, and the article B is taken out of the storage unit 1 by the transfer apparatus 12, and then the transfer apparatus 12 that is provided on the second stacker crane 4b is positioned at the article transfer position on the storage/retrieval side corresponding to the article support 3, and the taken out article B is transferred to the article support 3.

Describing more specifically, the ground-side controller 9 gives an HP standby command to the first crane control device 28A, and gives a retrieval command to the second crane control device 28B.

In the first crane control device 28A, control on the horizontal movement by the horizontal movement control portion 28a and control on the vertical movement by the vertical movement control portion 28b are performed such that the transfer apparatus 12 that is provided on the first stacker crane 4a is positioned at the article transfer position on the storage/retrieval side corresponding to the first article receiving platform 13a.

In the second crane control device 28B, control on the horizontal movement by the horizontal movement control portion 28a, control on the vertical movement by the vertical movement control portion 28b, and control on the transferring operation by the transferring operation control portion 28c are performed such that first, the second stacker crane 4b takes out the article B that is stored in the storage unit 1, and then the second stacker crane 4b transfers the taken out article B to the second article receiving platform 13b.

In this manner, the control means H can perform the plurality of processes, and when a command to transport the article B in or out is given, based on the command contents, a process selected from among the plurality of processes that can be performed is performed.

The following is a description concerning which process is performed by the control means H, based on the flowchart in FIG. 10.

In a case where a command to transport the article B in is given, if the command contents are to transport a plurality of articles B to the different storage units 1 for storage, then the control means H performs a storage selection process in which it is selected whether to perform the simultaneous storage operation or to successively perform the first individual storage operations, and performs the process selected in the storage selection process (steps 1 to 4). Furthermore, if the command contents are to transport one article B to one storage unit 1 for storage, then the control means H performs the second individual storage operation (steps 5 and 6).

In a case where a command to transport the article B out is given, if the command contents are to transport a plurality of articles B out by taking them out of the different storage units 1, then the control means performs a retrieval selection process in which it is selected whether to perform the simultaneous retrieval operation or to successively perform the first individual retrieval operations, and performs the process selected in the retrieval selection process (steps 7 to 10). Furthermore, if the command contents are to transport one article B out by taking it out of one storage unit 1, then the control means H performs the second individual retrieval operation (steps 11 and 12).

If a command to transport the article B to a particular storage unit 1 for storage and to transport the article B out by taking it out of a particular storage unit 1 is given, then the control means H successively performs the second individual storage operation and the second individual retrieval operation (steps 13 and 14).

Hereinafter, the cases categorized based on the command contents to transport the article B in or out are each described in more detail.

First, the case in which a command to transport a plurality of articles B to the different storage units 1 for storage is given as described in steps 2 to 4 in FIG. 10 is described.

In this case, the control means H performs the storage selection process. In this storage selection process, the control means H selects whether to perform the simultaneous storage operation or to successively perform the first individual storage operations based on the current positions of the two stacker cranes 4 in the horizontal movement direction of the stacker cranes 4.

Describing more specifically, the ground-side controller 9 acquires the current position of the first stacker crane 4a and the current position of the second stacker crane 4b in the communications with the first crane control device 28A and the second crane control device 28B. The ground-side controller 9 selects whether to perform the simultaneous storage operation or to successively perform the first individual storage operations based on the current position of the first stacker crane 4a and the current position of the second stacker crane 4b that have been acquired. Then, the ground-side controller 9 gives commands to the first crane control device 28A and the second crane control device 28B so as to perform the selected process.

In this manner, the control means H performs either one selected from among the simultaneous storage operation and the successive individual storage operations based on the current positions of the two stacker cranes 4.

As shown in the table in FIG. 11, in the horizontal movement direction of the stacker cranes 4, if the first stacker crane 4a and the second stacker crane 4b are positioned at the article supports 3, if the first stacker crane 4a is positioned at the article support 3 and the second stacker crane 4b is positioned at the closer-side area of the article storage racks 2, and if the first stacker crane 4a is positioned at the closer-side area of the article storage racks 2 and the second stacker crane 4b is positioned at the closer-side area of the article storage racks 2, then the simultaneous storage operation is performed.

If the first stacker crane 4a is positioned at the article support 3 and the second stacker crane 4b is positioned at the further-side area of the article storage racks 2, and if the first stacker crane 4a is positioned at the article storage racks 2 and the second stacker crane 4b is positioned at the further-side area of the article storage racks 2, then the first individual storage operations are successively performed.

In the table in FIG. 11, "closer-side area of the article storage racks 2" refers to an area, in the horizontal direction in the article storage racks 2, up to a location away in the horizontal direction by a set distance from the end portion adjacent to the article supports 3, and the remaining area is taken as "further-side area of the article storage racks 2".

Next, the case in which a command to transport one article B to one storage unit 1 for storage is given as described in steps 5 and 6 in FIG. 10 is described.

In this case, as shown the table in FIG. 12, the control means H performs the second individual storage operation regardless of the current positions of the first stacker crane 4a and the second stacker crane 4b.

Next, the case in which a command to transport a plurality of articles B out by taking them out of the different storage units 1 is given as described in steps 8 to 10 in FIG. 10 is described.

In this case, the control means H performs the retrieval selection process. In the retrieval selection process, the control means H selects whether to perform the simultaneous retrieval operation or to successively perform the first individual retrieval operations based on the current positions of the two stacker cranes 4 in the horizontal movement direction of the stacker cranes 4.

In this manner, the control means H performs either one selected from among the simultaneous retrieval operation and the successive individual retrieval operations based on the current positions of the two stacker cranes 4.

As shown in the table in FIG. 11, if the first stacker crane 4a and the second stacker crane 4b are positioned at the article supports 3, if the first stacker crane 4a is positioned at the article support 3 and the second stacker crane 4b is positioned at the closer-side area of the article storage racks 2, and if the first stacker crane 4a is positioned at the closer-side area of the article storage racks 2 and the second stacker crane 4b is positioned at the closer-side area of the article storage racks 2, then the simultaneous retrieval operation is performed.

If the first stacker crane 4a is positioned at the article support 3 and the second stacker crane 4b is positioned at the further-side area of the article storage racks 2, and if the first stacker crane 4a is positioned at the article storage racks 2 and the second stacker crane 4b is positioned at the further-side area of the article storage racks 2, then the first individual retrieval operations are successively performed.

Next, the case in which a command to transport one article B out by taking it out of one storage unit 1 is given as described in steps 11 and 12 in FIG. 10 is described.

In this case, as shown in the table in FIG. 12, the control means H performs the second individual retrieval operation regardless of the current positions of the first stacker crane 4a and the second stacker crane 4b.

Next, the case in which a command to transport the article B to the storage unit 1 in the article storage racks 2 for storage and a command to transport the article B out by taking it out of the storage unit 1 in the article storage racks 2 are given as described in steps 13 and 14 in FIG. 10 is described.

In this case, as shown in the table in FIG. 11, the control means H successively performs the second individual storage operation and the second individual retrieval operation regardless of the current positions of the first stacker crane 4a and the second stacker crane 4b.

Then, when the second individual storage operation and the second individual retrieval operation are being successively performed, if a command to transport the article B in and a command to transport the article B out by taking it out of the storage unit 1 are newly given, then the control means H judges whether or not it is possible to perform a cut-in process in which the first individual storage operation and the first individual retrieval operation are successively performed before the successive second individual storage operation and second individual retrieval operation end, and if it is possible to perform the cut-in process, then the process is performed.

Describing more specifically, the control means H obtains the ordinary process time taken before the transfer apparatus 12 that is provided on the second stacker crane 4b is positioned at the article transfer position on the storage/retrieval side by successively performing the second individual storage operation and the second individual retrieval operation, and the cut-in process time taken before the transfer apparatus 12 that is provided on the first stacker crane 4a is positioned at the article transfer position on the storage/retrieval side when performing the cut-in process in which the first individual storage operation and the first individual retrieval operation are successively performed. If the cut-in process time is shorter than the ordinary process time, then the control means H judges that it is possible to perform the cut-in process.

For example, if the second individual storage operation and the second individual retrieval operation are successively performed in this order, then the time taken before the transfer apparatus 12 that is provided on the second stacker crane 4b is positioned at the second article receiving platform 13b in the second individual retrieval operation is obtained as the ordinary process time. On the other hand, if the first individual storage operation and the first individual retrieval operation are successively performed in this order, then the time taken before the transfer apparatus 12 that is provided on the first stacker crane 4a is positioned at the first article receiving platform 13a in the first individual retrieval operation is obtained as the cut-in process time.

In this manner, when the article transportation is being performed with the second stacker cranes 4b, if a command to transport the article B in and to transport the article B out is newly given, then the article transportation is possible with the first stacker crane 4a currently being in an operation-stop state before the second stacker cranes 4b ends the article transportation, instead of waiting for the second stacker cranes 4b to end the article transportation and then successively transporting the next article with the second stacker cranes 4b. Accordingly, the article transportation can be performed with a plurality of stacker cranes 4 at the same time to the extent possible, and thus it is possible to achieve an improvement in the transport ability.

Furthermore, the cut-in process as described above can be performed also in a case where a command to transport one article B in is newly given when the second individual storage operation is being performed and a case where a command to transport one article B out is newly given when the second individual retrieval operation is being performed, in addition to the case where a command to transport the article B in and a command to transport the article B out by taking it out of the storage unit 1 are newly given when the second individual storage operation and the second individual retrieval operation are being successively performed.

More specifically, the configuration can be such that when a transport process is being performed in which the stacker crane 4 on the side of the article storage racks 2, among the plurality of stacker cranes 4, transports the article B, and the remaining stacker cranes 4 are in an operation-stop state, if a command to transport the article B in and to transport the article B out is newly given, then the control means H judges whether or not it is possible to perform the cut-in transport process in which a transport process is performed by operating the stacker cranes 4 currently being in an operation-stop state before the stacker crane 4 currently performing the transport process ends the transport process, and if it is possible to perform the cut-in transport process, then the process is performed.

With this configuration, when the article transportation is being performed with the stacker crane 4 that is positioned on the side of the article storage racks 2, among the plurality of stacker cranes 4, in a case where a command to transport the article B in and to transport the article B out is newly given, such as a case where commands to transport the article B in and to transport the article B out are successively given, then the article transportation is possible with the stacker cranes currently being in an operation-stop state before the stacker crane 4 currently performing the article transportation ends the article transportation, instead of waiting for the stacker crane 4 currently transporting the article to end the article transportation and then transporting the next article. Accordingly, the transport ability can be improved.

Second Embodiment

Next, an article storage facility in a second embodiment is described. The second embodiment is another embodiment of the article transfer means that is provided in the article-transporting moving members in the first embodiment. Hereinafter, this article transfer means is described in more detail, and a description of the other components has been omitted because it is similar to that in the first embodiment.

Figure 13:
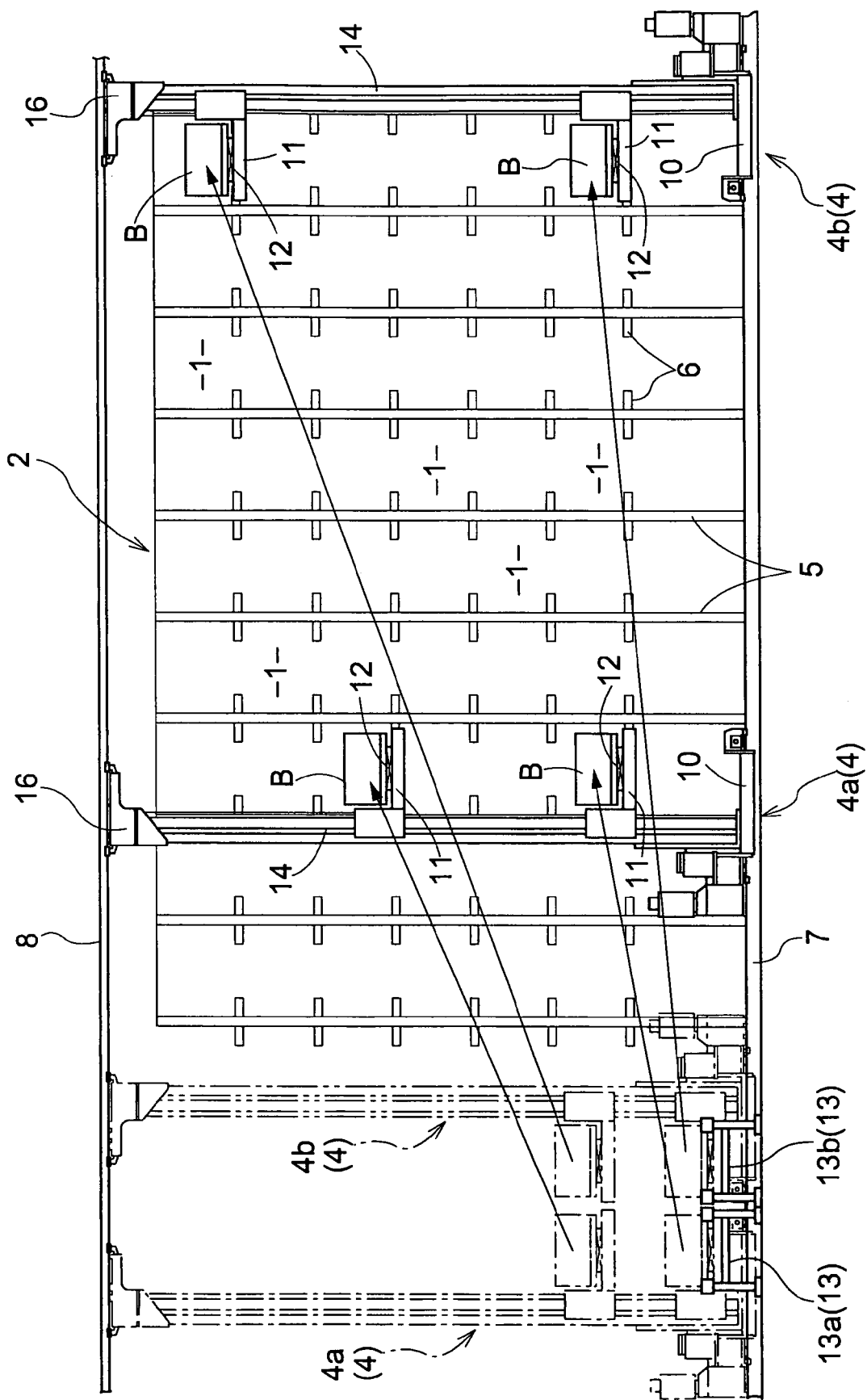
FIG. 13 is a side view of an article storage facility in a second embodiment.

As shown in FIG. 13, each stacker crane 4 as the article-transporting moving member is provided with a plurality of transfer apparatuses 12 as the article transfer means in such a manner that they are aligned in the vertical direction.

Two vertically movable units 11 that are provided with the transfer apparatuses 12 in such a manner that the vertically movable units 11 are aligned in the vertical direction are provided on the travel vehicle 10 in the stacker crane 4, and the two vertically movable units 11 are provided to be capable of being vertically moved individually with respect to the travel vehicle 10.

If a plurality of articles are transferred to the storage units 1 with different heights for transfer, among the plurality of storage units 1 in the article storage racks 2, then the control means H controls the vertical movement of the two transfer apparatuses 12 on each of the two stacker cranes 4 and the transferring operation of the two transfer apparatuses 12 such that the plurality of transfer apparatuses 12 are positioned at the article transfer positions on the rack side corresponding to the storage units 1 for transfer, and the articles B are transferred to and from the storage units 1 at which the articles are to be transferred.

FIG. 13 shows a side view of the article storage facility in the simultaneous storage operation.

Describing more specifically, the vertical movement control portion 28b of the crane control device 28 is configured so as to control the vertical movement of the two vertically movable units 11 individually such that the two transfer apparatuses 12 are positioned at the article transfer positions on the rack side corresponding to the storage units 1 with different heights.

Furthermore, the transferring operation control portion 28c of the crane control device 28 is configured so as to control the transferring operation of the two transfer apparatuses 12 such that articles are respectively transferred to and from the storage units 1 with different heights.

Although not shown in the drawings, when a plurality of first article receiving platforms 13a and second article receiving platforms 13b are stacked in the vertical direction, at the article supports 3, it is possible to transfer the articles B with the plurality of transfer apparatuses 12 in a state where the plurality of transfer apparatuses 12 are aligned in the vertical direction.

In this manner, it is possible to transport a plurality of articles B in or out at the same time with one stacker crane 4, and in the configuration shown in FIG. 13, it is possible to transport up to four articles B in at the same time with two stacker cranes 4.

In the second embodiment, instead of the laser vertical range finder 21, rotary encoders or other components (not shown) that can rotate as the two vertically movable units 11 are vertically moved are respectively provided on the vertically movable units 11 in order to detect the vertical position of the vertically movable units 11, and the crane control device 28 detects the vertical position of each of the two vertically movable units 11 based on information detected by the two rotary encoders.

Third Embodiment

Next, an article storage facility in a third embodiment is described. The third embodiment is another embodiment of the stacker cranes 4 as the article-transporting moving members in the first embodiment. Hereinafter, these stacker cranes 4 are described in more detail, and a description of the other components has been omitted because it is similar to that in the first embodiment.

Figure 14:
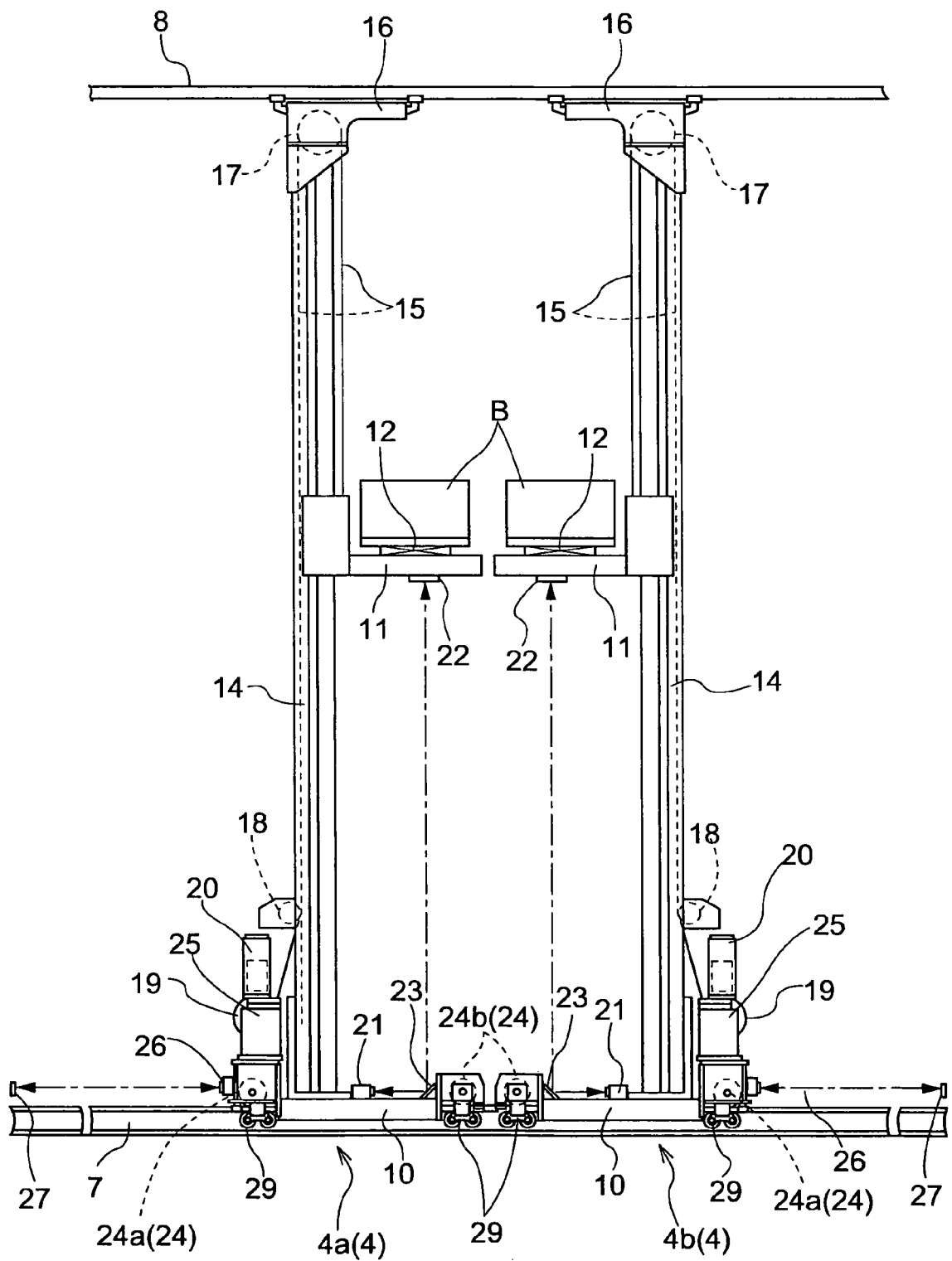
FIG. 14 is a side view of stacker cranes in a third embodiment.

As shown in FIG. 14, the single vertical post 14 is disposed upright on the travel vehicle 10, and the vertical post 14 is disposed upright on the opposite side of the position of the other stacker crane 4 in the horizontal movement direction of the stacker cranes 4.

The travel vehicle 10 of the stacker crane 4 is provided with the front and rear travel wheels 24a and 24b with a spacing interposed therebetween in the longitudinal direction of the travel rail 7 serving as the track, and among the front and rear travel wheels 24, the travel wheel 24a on the opposite side of the position of the other stacker crane 4 in the horizontal movement direction of the stacker cranes 4 is configured as a driving wheel that is driven by the electric travel motor 25, and the travel wheel 24b on the side of the other stacker crane 4 in the horizontal movement direction of the stacker cranes 4 is configured as a driven wheel that can freely rotate.

The configuration of the vertical posts 14 and the configuration of the front and rear travel wheels 24 described above are similar to those in the first embodiment. When the vertical posts 14 that are arranged upright on the travel vehicles 10 are single posts, the width in the fore-and-aft direction of the travel vehicles 10 can be made short, and thus the two stacker cranes 4 can be positioned such that the transfer apparatuses 12 of the two stacker cranes 4 are positioned at the article transfer positions on the rack side respectively corresponding to the storage units 1 that are adjacent to each other in the horizontal direction. Accordingly, if the two storage units 1 in which the articles B are to be put in the simultaneous storage operation are the two storage units 1 that are adjacent to each other in the horizontal movement direction, and if the two storage units 1 from which the articles B are to be taken out in the simultaneous retrieval operation are the two storage units 1 that are adjacent to each other in the horizontal movement direction, the two stacker cranes 4 can transfer the articles B to and from the storage units 1 at the same time.

However, in a case where the width in the fore-and-aft direction of the travel vehicle 10 is made short, when the travel vehicle 10 is horizontally moved, due to the inertial force, the travel vehicle 10 is inclined backward when the travel vehicle 10 is accelerated, and the travel vehicle 10 is inclined forward when the travel vehicle 10 is decelerated, and thus there is a possibility that one of the front and rear travel wheels 24a and 24b moves upward off the travel rail 7.

Thus, each of the front and rear travel wheels 24a and 24b is provided with restricting wheels 29 for regulating the upward movement of the travel wheel 24a, 24b off the travel rail 7 by being in contact with the travel rail 7 so as to regulate the upward movement.

Hereinafter, the restricting wheels 29 are described in more detail. The restricting wheels 29 that are provided at each of the front and rear travel wheels 24a and 24b have the same configuration, and thus the restricting wheels 29 that are provided at the travel wheel 24a as the driving wheel, among the front and rear travel wheels 24a and 24b, are described based on FIGS. 15 to 21.

Figure 15:
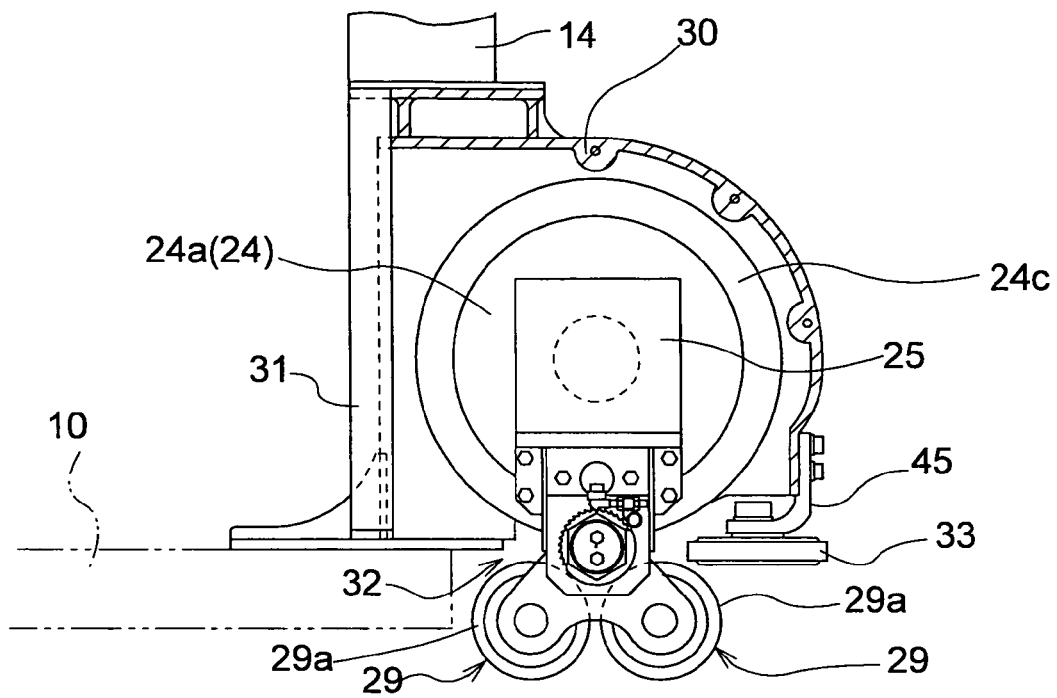
FIG. 15 is a side view of the main portions of the stacker cranes in the third embodiment.
Figure 16:
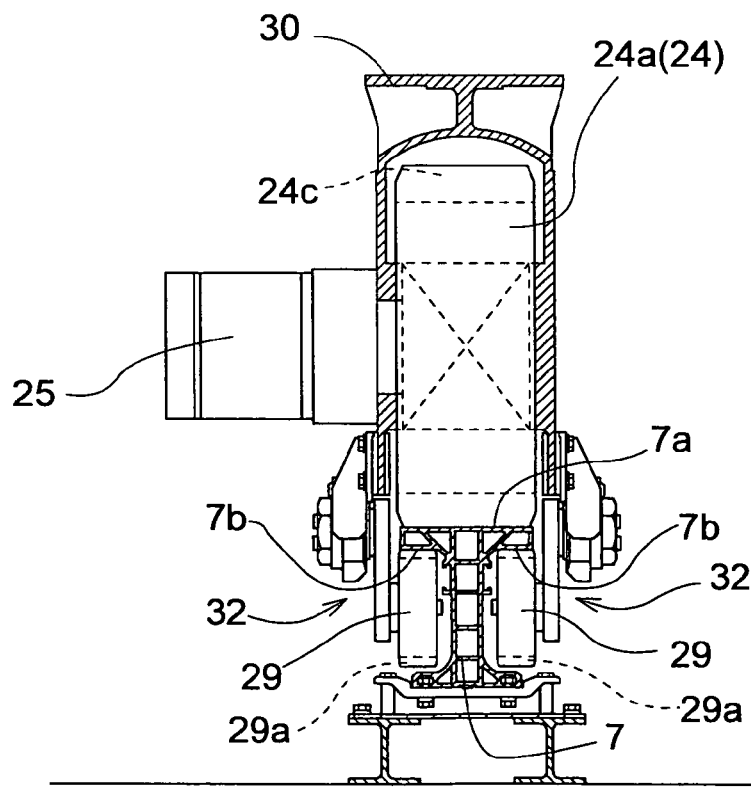
FIG. 16 is a vertical cross-sectional view of the main portions of the stacker cranes in the third embodiment.
Figure 17:
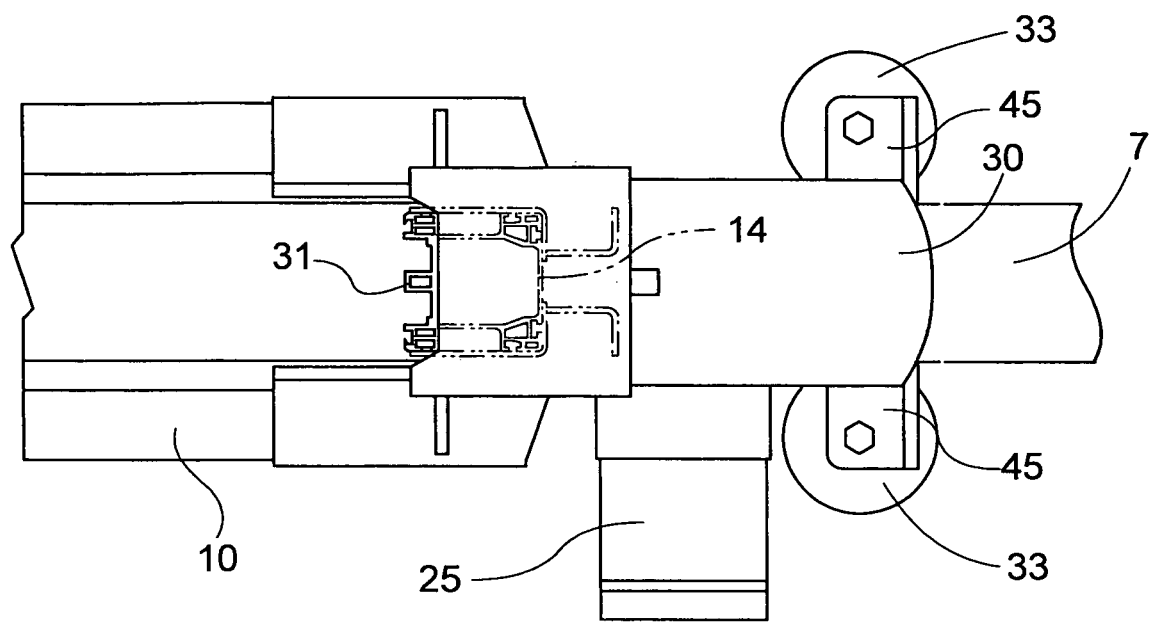
FIG. 17 is a plan view of the main portions of the stacker cranes in the third embodiment.

As shown in FIGS. 15 to 17, the end portion of the travel vehicle 10 in the fore-and-aft direction is provided with a support frame 30 for supporting the travel the wheel 24 such that the wheel 24 can rotate about the horizontal axis, and the vertical post 14 is disposed upright on the upper portion of the support frame 30. Furthermore, the support frame 30 is provided with a guide rail 31 for guiding and supporting a guide roller provided on the vertically movable unit 11.

The restricting wheels 29 are supported so as to rotate about the horizontal axes, and are provided with self-energizing adjustment means 32 for adjusting the contact pressure of the restricting wheels 29 with respect to the travel rail 7 by vertically moving the restricting wheels 29. In addition to the restricting wheels 29, guide wheel members 33 for guiding the travel vehicle 10 along the travel rail 7 by being in contact with the travel rail 7 so as to limit or restrict the lateral movement are provided. The guide wheel members 33 are supported by guiding support members 45 that are connected to and supported by the support frame 30 such that the guide wheel members 33 can rotate about the vertical axes.

The travel wheel 24a as the driving wheel is provided so as to be driven to be rotated by the electric travel motor 25, and is provided with a deceleration mechanism and a braking mechanism (not shown) in addition to the electric travel motor 25. The drive portions such as the electric travel motor 25, the deceleration mechanism, and the braking mechanism are covered by a cover (not shown).

A ring-shaped traveling tire 24c made of urethane rubber is attached to the outer circumferential portion of the travel wheel 24a. Furthermore, ring-shaped restricting tires 29a as elastic members made of urethane rubber are attached to the outer circumferential portions of the restricting wheels 29.

Figure 19:
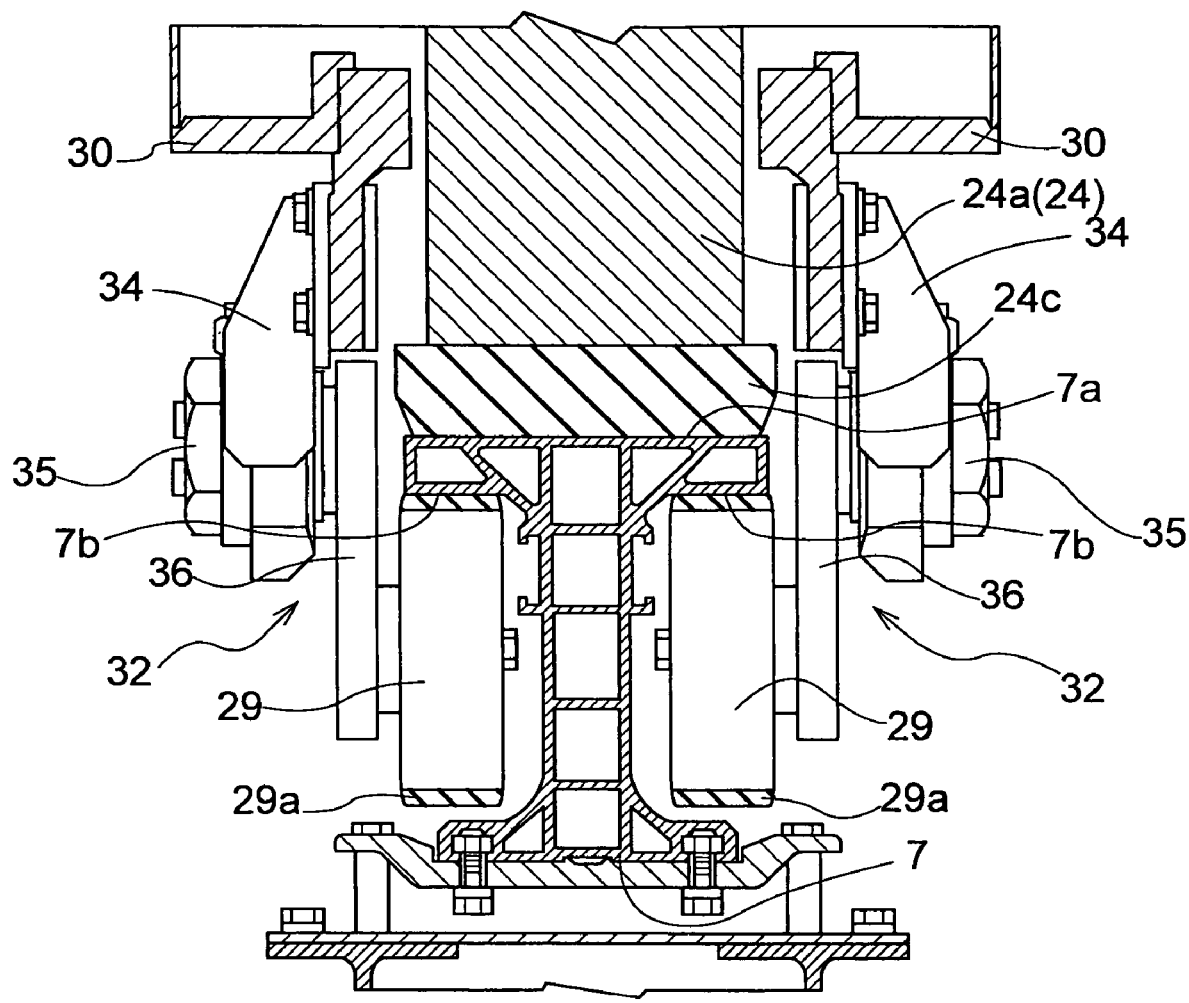
FIG. 19 is an enlarged view of the main portions in FIG. 16.

As shown in FIGS. 16 and 19, the travel rail 7 is in the shape of a T in which a traveling guide face 7a that is in contact with the traveling tire 24c of the travel wheel 24a is formed on the upper face portion, and a pair of left and right regulating guide faces 7b that are in contact with the restricting tires 29a of the restricting wheels 29 are formed on the rear side of the traveling guide face 7a.

The restricting wheels 29 are arranged below of the regulating guide faces 7b of the travel rail 7, and are in contact with the regulating guide faces 7b of the travel rail 7 from the below, and thus the restricting wheels 29 restrict the upward movement of the travel wheel 24 off the travel rail 7 by being in contact with the travel rail 7 so as to regulate the upward movement. Furthermore, the restricting wheels 29 precisely restrict the upward movement of the travel wheel 24 off the travel rail 7 by being in contact with the travel rail 7 with the contact pressure caused by the elastic force of the restricting tires 29a.

Figure 18:
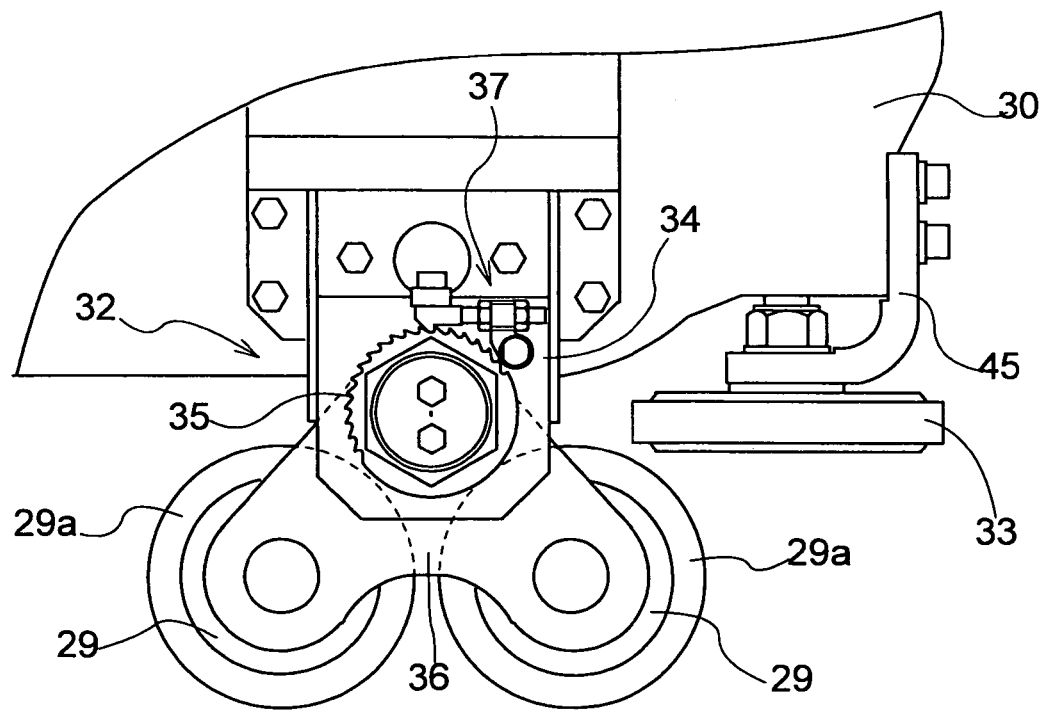
FIG. 18 is an enlarged view of the main portions in FIG. 15.

As shown in FIGS. 18 and 19, the adjustment means 32 supports the restricting wheels 29 such that the restricting wheels 29 can be vertically moved with respect to the support frame 30, and adjusts the contact pressure of the restricting wheels 29 with respect to the travel rail 7 using the elastic deformation of the restricting tires 29a.

The adjustment means 32 is constituted by an operation member 35 that is supported by a base holder 34 fixedly supported by the support frame 30 such that the operation member 35 can rotate about the horizontal axis, and a support member 36 that is externally fit to and supported by the operation member 35 and that supports the restricting wheels 29 such that they can rotate about the horizontal axes.

Figure 20:
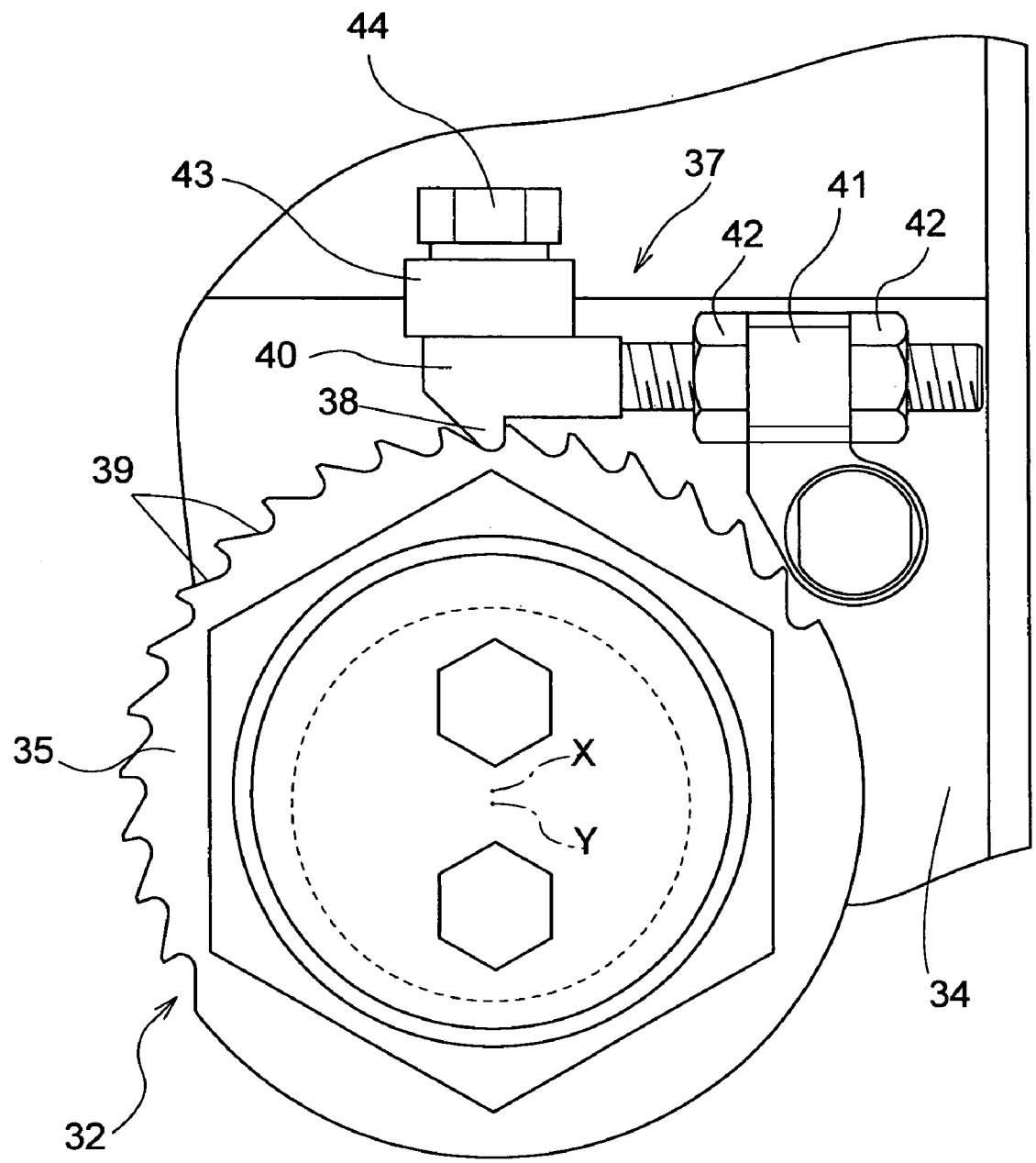
FIG. 20 is an enlarged view of the main portions in FIG. 18.
Figure 21:
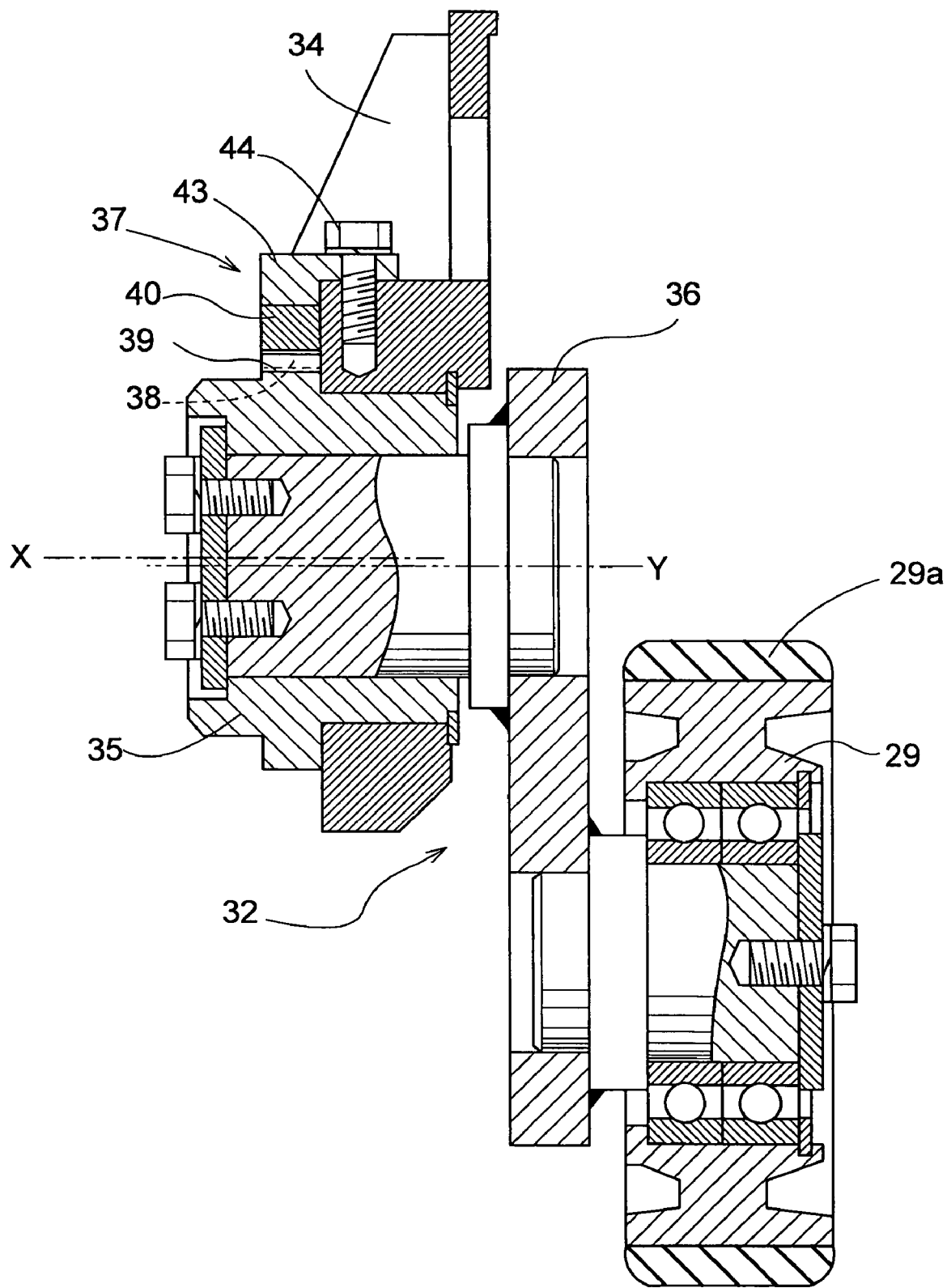
FIG. 21 is an enlarged view of the main portions in FIG. 19.

As shown in FIGS. 20 and 21, the operation member 35 is supported such that it can rotate about a rotation axis X with respect to the base holder 34, and the support member 36 is supported such that it can swing about a swinging axis Y with respect to the operation member 35. The rotation axis X of the operation member 35 and the swinging axis Y of the support member 36 are provided in an eccentric state. In this manner, the self-energizing adjustment means 32 is configured as an eccentric cam mechanism.

The following is a description concerning the operation of the adjustment means 32. When the operation member 35 is rotated about the rotation axis X, due to the self-weight of the restricting wheels 29 and the regulation on the upward movement of the restricting wheels 29 at the travel rail 7, the support member 36 swings about the swinging axis Y with respect to the operation member 35 and thus the support member 36 is vertically moved with respect to the support frame 30 while keeping the posture.

The contact pressure of the restricting wheels 29 with respect to the travel rail 7 is adjusted by rotating the operation member 35 about the rotation axis X, thereby adjusting the position of the support member 36 in the vertical direction.

Furthermore, lock means 37 capable of switching between a regulation state in which the rotation of the operation member 35 is regulated and a cancellation state in which the regulation on the rotation is cancelled is provided. The lock means 37 is constituted by a protruding engaging portion 38 and dented engaged portions 39 that are engaged with the engaging portion 38. The state is switched to the regulation state by engaging the engaging portion 38 with the engaged portion 39, and to the cancellation state by canceling the engagement between the engaging portion 38 and the engaged portion 39.

The engaging portion 38 is formed in such a manner that it projects downward on the front end portion of a rod-shaped adjustment member 40. To a hole portion formed at the front end portion of a swinging portion 41 supported such that it can swing about the horizontal axis with respect to the base holder 34, the adjustment member 40 is internally fit such that it can slidingly move. Slide regulating members 42 for regulating the sliding movement of the adjustment member 40 with respect to the swinging portion 41 by being screwed onto the screw portion of the adjustment member 40 and holding the swinging portion 41 therebetween are provided. When the slide regulating members 42 regulate the sliding movement of the adjustment member 40 with respect to the swinging portion 41, the adjustment member 40 swings together with the swinging portion 41. Furthermore, a swing regulating member 43 for regulating the swinging of the swinging portion 41 is provided above the front end portion of the adjustment member 40 on which the engaging portion 38 is formed. The swing regulating member 43 is fixed by a bolt 44 in such a manner that it projects from the base holder 34, and regulates the swinging of the adjustment member 40 by abutting against the adjustment member 40.

The engaged portions 39 are formed at every constant angle (such as ten degrees) on the outer circumferential portion of the operation member 35, and in total, 19 engaged portions 39 are formed throughout 180 degrees, which is the half of the entire length of the outer circumferential portion of the operation member 35.

The following is a description concerning the operation of the restricting wheels 29 when their contact pressure with respect to the travel rail 7 is adjusted.

First, when the bolt 44 that fixes the swing regulating member 43 is loosened or removed, the regulation on the swinging of the adjustment member 40 by the swing regulating member 43 is cancelled. Then, when the swinging portion 41 is swung together with the adjustment member 40 about the horizontal axis, the engagement between the engaging portion 38 and the engaged portion 39 is cancelled. When the engagement between the engaging portion 38 and the engaged portion 39 is cancelled in this manner, it is possible to rotate the operation member 35, and when the operation member 35 is rotated, the position of the support member 36 in the vertical direction is adjusted, and the contact pressure of the restricting wheels 29 with respect to the travel rail 7 is adjusted.

After the contact pressure of the restricting wheels 29 with respect to the travel rail 7 is adjusted, when the swinging portion 41 is swung together with the adjustment member 40 about the horizontal axis, the engaging portion 38 and the engaged portion 39 are engaged with each other. When the engaging portion 38 and the engaged portion 39 cannot be engaged with each other, the slide regulating members 42 are moved in the longitudinal direction of the adjustment member 40, and thus it is made possible that the adjustment member 40 slidingly moves with respect to the swinging portion 41. The adjustment member 40 is slidingly moved with respect to the swinging portion 41 such that the engaging portion 38 and the engaged portion 39 can be engaged with each other. Subsequently, in a state where the slide regulating members 42 regulate the sliding movement of the adjustment member 40 with respect to the swinging portion 41 by holding the swinging portion 41 therebetween, when the swinging portion 41 is swung together with the adjustment member 40 about the horizontal axis, the engaging portion 38 and the engaged portion 39 are engaged with each other.

When the engaging portion 38 and the engaged portion 39 are engaged with each other, the engagement between the engaging portion 38 and the engaged portion 39 is maintained by fixing the swing regulating member 43 with the bolt 44 and regulating the swinging of the adjustment member 40 with the swing regulating member 43.

Other Embodiments (1) In the first to third embodiments, the simultaneous storage operation and the simultaneous retrieval operation can be performed by the control means H, but it is also possible that only the simultaneous storage operation can be performed or only the simultaneous retrieval operation can be performed.

(2) In the first to third embodiments, if a command to transport a plurality of articles B in is given, then the control means H performs the simultaneous storage operation or successively performs the first individual storage operations, but it is also possible to always perform the simultaneous storage operation if a command to transport a plurality of articles B in is given.

Furthermore, if a command to transport a plurality of articles B out is given, then the control means H performs the simultaneous retrieval operation or successively performs the first individual retrieval operations, but it is also possible to always perform the simultaneous retrieval operation.

(3) In the first to third embodiments, if a command to transport a plurality of articles B in is given, then the control means H may successively perform the first individual storage operations, but instead of these processes, it is also possible to successively perform the second individual storage operations.

Furthermore, if a command to transport a plurality of articles B out is given, it is also possible to successively perform the second individual retrieval operations instead of successively performing the first individual retrieval operations.

(4) In the first to third embodiments, in the storage selection process, it is selected whether to perform the simultaneous storage operation or to successively perform the first individual storage operations based on the current position of the first stacker crane 4a and the current position of the second stacker crane 4b, but the conditions for the selection are not limited to the current position of the first stacker crane 4a and the current position of the second stacker crane 4b, and it is also possible to make the selection based on various conditions.

Furthermore, in the retrieval selection process, the conditions are not limited to the current position of the first stacker crane 4a and the current position of the second stacker crane 4b, and it is also possible to select the simultaneous retrieval operation or the successive first individual retrieval operations based on various conditions.

(5) In the first to third embodiments, the single vertical post 14 for guiding and supporting the vertically movable unit 11 such that it can be vertically moved is disposed upright on the travel vehicle 10, but the number of the vertical post 14 that is disposed upright on the travel vehicle 10 can be changed as appropriate, and for example, it is also possible that the vertical posts 14 are arranged upright respectively on both end portions of the travel vehicle 10 in the horizontal movement direction.

(6) In the first to third embodiments, in order to detect the horizontal position of the travel vehicle 10 on the horizontal route and the vertical position of the vertically movable unit 11 on the vertical route, the laser horizontal range finder 26 and the laser vertical range finder 21 are provided, but the configuration for detecting the horizontal position of the travel vehicle 10 on the horizontal route and the vertical position of the vertically movable unit 11 on the vertical route can be changed as appropriate.

For example, it is also possible to detect the horizontal position of the travel vehicle 10 on the horizontal route and the vertical position of the vertically movable unit 11 on the vertical route, by providing rotary encoders or other components that can rotate as the travel vehicle 10 travels or the vertically movable unit 11 is vertically moved.

Furthermore, when providing the laser horizontal range finder 26, it is also possible to set the laser horizontal range finders 26 on both end portions of the travel rail 7 and to install the reflection plate 27 on the travel vehicle 10, in the opposite manner to the first embodiment. In this case, information detected by the laser horizontal range finders 26 is input to the ground-side controller 9, and the ground-side controller 9 communicates with the crane control device 28 with respect to the horizontal position of the travel vehicle 10.

(7) In the first to third embodiments, the examples were shown in which the two stacker cranes 4 are provided, but it is also possible to provide three or more stacker cranes 4.

What is claimed is:

1. Article storage facility comprising:
   an article storage rack having a plurality of storage units arranged in horizontal rows and vertical columns, the article storage rack having a first horizontal end and a second horizontal end spaced apart from the first horizontal end in a horizontal direction;
   article supports arranged in a horizontal direction for use in storing articles into and retrieving articles from the article storage rack, the article supports being provided independently of the article storage rack, and a plurality of the article supports are positioned closer to the first horizontal end than to the second horizontal end;
   a plurality of moving members movable in a horizontal direction on a single predetermined path for transporting articles between the storage units and the article supports, wherein the plurality of moving members are adapted to be able to be at positions corresponding to the article supports such that the plurality of moving members can transfer articles from or to the corresponding article supports simultaneously;
   transfer means provided to each of the plurality of moving members for transferring an article between the storage unit or the article support and the moving member; and
   control means for controlling operations of the moving members and the transfer means, wherein the control means controls horizontal movement of the moving members and the vertical movements of the transfer means in order to move the transfer means to rack side article transfer positions which correspond to each of the plurality of storage unit or to storage/retrieval transfer positions that correspond to the article supports, wherein the control means further controls transfer operations of the transfer means so that the transfer means can transfer articles from and to the storage units and the article supports at the rack side article transfer positions and storage/retrieval transfer positions respectively,
   and further wherein, in response to a storing command to store a plurality of articles to different storage units of the rack, the control means performs a multiple storing operation wherein the control means controls horizontal movements of the plurality of moving members, vertical movements of the plurality of transfer means provided to each of the plurality of moving members, and transfer operations of the plurality of transfer means in order to cause the plurality of the transfer means: a) to be at respective storage/retrieval positions; b) to receive articles from respective article supports; c) to move to rack side article transfer positions corresponding to the storage units in which the articles are to be stored; and d) to transfer the received articles to the storage units.

2. Article storage facility comprising:
   an article storage rack having a plurality of storage units arranged in horizontal rows and vertical columns, the article storage rack having a first horizontal end and a second horizontal end spaced apart from the first horizontal end in a horizontal direction;
   article supports arranged in a horizontal direction for use in storing articles into and retrieving articles from the article storage rack, the article supports being provided independently of the article storage rack, and a plurality of the article supports are positioned closer to the first horizontal end than to the second horizontal end;
   a plurality of moving members movable in a horizontal direction on a single predetermined path for transporting articles between the storage units and the article supports, wherein the plurality of moving members are adapted to be able to be at positions corresponding to the article supports such that the plurality of moving members can transfer articles from or to the corresponding article supports simultaneously;

transfer means provided to each of the plurality of moving members for transferring an article between the storage unit or the article support and the moving member; and control means for controlling operations of the moving members and the transfer means, wherein the control means controls horizontal movement of the moving members and the vertical movements of the transfer means in order to move the transfer means to rack side article transfer positions which correspond to each of the plurality of storage unit or to storage/retrieval transfer positions that correspond to the article supports, wherein the control means further controls transfer operations of the transfer means so that the transfer means can transfer articles from and to the storage units and the article supports at the rack side article transfer positions and storage/retrieval transfer positions respectively, and further wherein, in response to a retrieving command to retrieve a plurality of articles from different storage units of the rack, the control means performs a multiple retrieval operation wherein the control means controls horizontal movements of the plurality of moving members, vertical movements of the plurality of transfer means provided to each of the plurality of moving members, and transfer operations of the plurality of transfer means in order to cause the plurality of the transfer means: a) to be at the rack side article transfer positions corresponding to the storage units from which the articles are to be retrieved; b) to transfer articles from respective article units; c) to move to corresponding article supports; and d) to transfer the retrieved articles to the article supports.

3. Article storage facility as defined in claim 1, wherein two moving members are provided in the facility, and wherein, in response to a storing command to store one article to one storage unit of the rack, the control means performs a single storing operation of one of the two moving members wherein the control means controls horizontal movement of the moving member, vertical movement of the transfer means, and transfer operation of the transfer means in order to cause transfer means of the one of the moving members: a) to be at a storage/retrieval position corresponding to an article support; b) to receive the one article from the article support; c) to move to a rack side article transfer position corresponding to the storage unit in which the article is to be stored; and d) to transfer the received article to the storage unit.

4. Article storage facility as defined in claim 2, wherein two moving members are provided in the facility, and wherein, in response to a retrieval command to retrieve one article from one storage unit of the rack, the control means performs a single retrieval operation of one of the two moving members wherein the control means controls horizontal movement of the moving member, vertical movement of the transfer means, and transfer operation of the transfer means in order to cause transfer means of the one of the moving members: a) to be at a rack side article transfer position corresponding to a storage unit from which the article is to be retrieved; b) to receive the one article from the article unit; c) to move to a storage/retrieval position corresponding to an article support; and d) to transfer the retrieved article to the article support.

5. Article storage facility as defined in claim 3, wherein in response to a storing command to store a plurality of articles to different storage units of the rack, the control means performs selected one of the multiple storage operation and a series of the single storage operations depending on current positions of the two moving members in a horizontal direction.

6. Article storage facility as defined in claim 4, wherein in response to a retrieving command to retrieve a plurality of articles from different storage units of the rack, the control means performs selected one of the multiple retrieval operation and a series of the single retrieval operations depending on current positions of the two moving members in a horizontal direction.

7. Article storage facility as defined in claim 1, wherein two moving members are provided in the facility, and wherein, in response to a storing command to store one article to one storage unit of the rack and a retrieval command to retrieve another article from another storage unit, the control means performs a single storing operation of one of the two moving members that is closer to the rack wherein the control means controls horizontal movement of the moving member, vertical movement of the transfer means, and transfer operation of the transfer means in order to cause transfer means of the one of the moving members: a) to be at a storage/retrieval position corresponding to an article support; b) to receive the one article from the article support; c) to move to a rack side article transfer position corresponding to the storage unit in which the article is to be stored; and d) to transfer the received article to the storage unit and followed by a single retrieval operation of the one moving member that is closer to the rack wherein the control means controls horizontal movement of the moving member, vertical movement of the transfer means, and transfer operation of the transfer means in order to cause the transfer means of the one of the moving members: a) to be at a rack side article transfer position corresponding to the another storage unit from which the another article is to be retrieved; b) to receive the another article from the another article unit; c) to move to a storage/retrieval position corresponding to an article support; and d) to transfer the retrieved article to the article support.

8. Article storage facility as defined in claim 2, wherein two moving members are provided in the facility, and wherein, in response to a storing command to store one article to one storage unit of the rack and a retrieval command to retrieve another article from another storage unit, the control means performs a single storing operation of one of the two moving members that is closer to the rack wherein the control means controls horizontal movement of the moving member, vertical movement of the transfer means, and transfer operation of the transfer means in order to cause transfer means of the one of the moving members: a) to be at a storage/retrieval position corresponding to an article support; b) to receive the one article from the article support; c) to move to a rack side article transfer position corresponding to the storage unit in which the article is to be stored; and d) to transfer the received article to the storage unit and followed by a single retrieval operation of the one moving member that is closer to the rack wherein the control means controls horizontal movement of the moving member, vertical movement of the transfer means, and transfer operation of the transfer means in order to cause the transfer means of the one of the moving members: a) to be at a rack side article transfer position corresponding to the another storage unit from which the another article is to be retrieved; b) to receive the another article from the another article unit; c) to move to a storage/retrieval position corresponding to an article support; and d) to transfer the retrieved article to the article support.

9. Article storage facility as defined in claim 1, wherein each of the plurality of moving members has a plurality of transfer means arranged at different vertical positions and wherein when a plurality of articles need to be stored in or retrieved from a plurality of storage units that have different heights, the control means controls vertical movements and transfer operations of the plurality of transfer means of each of the plurality of moving members to cause the plurality of transfer means to be at rack side article transfer positions corresponding to the storage units and to transfer articles to or from the plurality of storage units.

10. Article storage facility comprising:
an article storage rack having a plurality of storage units arranged in horizontal rows and vertical columns, the article storage rack having a first horizontal end and a second horizontal end spaced apart from the first horizontal end in a horizontal direction;
article supports arranged in a horizontal direction for use in storing articles into and retrieving articles from the article storage rack, the article supports being provided independently of the article storage rack and a plurality of the article supports are positioned closer to the first horizontal end than to the second horizontal end;
a first moving member and a second moving member that are capable of moving on a single predetermined path to transport articles between the storage units and the article supports, the first moving member has a first single vertical post provided in a region substantially spaced in a horizontal direction from an end of the first moving member closer to the second moving member, and the second moving member has a second single vertical post provided in a region substantially spaced in a horizontal direction from an end of the second moving member closer to the first moving member;
first transfer means movable along the first vertical post for transferring an article between a storage unit or one of the article supports and the first moving member; and
second transfer means movable along the second vertical post for transferring an article between a storage unit or one of the article supports and the second moving member.

11. Article storage facility as defined in claim 10, wherein the predetermined path is a rail and wherein each of the movable body runs on the rail by means of a front wheel and a rear wheel spaced apart from the front wheel in a direction the rail extends, a restricting wheel is provided for each of the front and rear wheels wherein the restricting wheel restricts lifting of the corresponding wheel from the rail by contacting the rail.

12. Article storage facility as defined in claim 11, wherein the restricting wheel contacts the rail with resilient pressure provided by a resilient member.

13. Article storage facility as defined in claim 10, wherein the first vertical post has a first surface that faces the second vertical post, and a first upper frame provided adjacent to a guide rail extending parallel to and spaced vertically from the predetermined path;
the second vertical post has a second surface that faces the first vertical post, and a second upper frame provided adjacent to the guide rail; and
wherein the first upper frame extends toward the second upper frame beyond the first surface, and the second upper frame extends toward the first upper frame beyond the second surface.

14. Article storage facility as defined in claim 10, wherein the first transfer means has a vertically movable unit movable along the first vertical post, and a lower surface of the first vertical movable unit has a first reflector mounted thereto, and the first moving member has a first laser range finder, and a first mirror that reflects a laser beam from the first laser range finder perpendicularly and upwardly toward the first reflector, the first laser range finder and the first mirror being located between the end closer to the second moving member and the first vertical post,
the second transfer means has a second vertically movable unit movable along the second vertical post, and a lower surface of the second vertical movable unit has a second reflector mounted thereto, and the second moving member has a second laser range finder, and a second mirror that reflects a laser beam from the second laser range finder perpendicularly and upwardly toward the second reflector, the second laser range finder and the second mirror being located between the end closer to the first moving member and the second vertical post.

15. A method of operating article storage facility, the article storage facility having an article storage rack having a plurality of storage units arranged in horizontal rows and vertical columns, the rack having a first end and a second end spaced apart from the first end in a first horizontal direction; first and second article supports arranged in the first horizontal direction for articles to be stored into and retrieved from the rack, both of the first and the second article supports being closer to the first end than the second end, and the second article support being closer to the second end than the first article support; first and second vehicles movable along a single predetermined path extending substantially in the first horizontal direction and each having at least one vertical post; a vertically moving unit provided to each of the first and second vehicles and movable along the respective vertical post; and a transfer apparatus provided to each of the vertically moving units for transferring articles between a storage unit or either one of the first and second article supports and the corresponding vehicle, the method comprising:
placing a first article, to be stored in a first storage unit in a first column closer to the first end, on the first article support;
placing a second article, to be stored in a second storage unit in a second column closer to the second end, on the second article support;
locating the first vehicle at a position corresponding to the first article support;
locating the second vehicle at a position corresponding to the second article support;
operating the transfer apparatus of the first vehicle to have the first article supported on the first vehicle;
operating the transfer apparatus of the second vehicle to have the second article supported on the second vehicle;
causing the second vehicle to move to the second column;
causing the first vehicle to move to the first column;
causing the vertically moving unit of the second vehicle to move to a position corresponding to the second storage unit before, during, or after the step of causing the second vehicle to move to the second column;
causing the vertically moving unit of the first vehicle to move to a position corresponding to the first storage unit before, during, or after the step of causing the first vehicle to move to the first column;
operating the transfer apparatus of the second vehicle to transfer the second article to the second storage unit; and
operating the transfer apparatus of the first vehicle to transfer the first article to the first storage unit.

16. A method of operating article storage facility, the article storage facility having an article storage rack having a plurality of storage units arranged in horizontal rows and vertical columns, the rack having a first end and a second end spaced apart from the first end in a first horizontal direction; first and second article supports arranged in the first horizontal direction for articles to be stored into and retrieved from the rack, both of the first and the second article supports being closer to the first end than the second end, and the second article support being closer to the second end than the first article support; first and second vehicles movable along a single predetermined path extending substantially in the first horizontal direction and each having at least one vertical post; a vertically moving unit provided to each of the first and second vehicles and movable along the respective vertical post; and a transfer apparatus provided to each of the vertically moving units for transferring articles between a storage unit or either one of the first and second article supports and the corresponding vehicle, the method comprising:

causing the second vehicle to move to a second column, that is closer to the second end than a first column is to the second end, in which a target second storage unit belongs;

causing the first vehicle to move to the first column, that is closer to the first end than the second column is to the first end, in which a target first storage unit belongs;

causing the vertically movable unit of the second vehicle to move to a position corresponding to the second storage unit before, during, or after the step of causing the second vehicle to move to the second column;

causing the vertically movable unit of the first vehicle to move to a position corresponding to the first storage unit before, during, or after the step of causing the first vehicle to move to the first column;

operating the transfer apparatus of the second vehicle to transfer a second article in the second storage unit to the second vehicle;

operating the transfer apparatus of the first vehicle to transfer a first article in the first storage unit to the first vehicle;

causing the second vehicle to move to a position corresponding to the second article support;

causing the first vehicle to move to a position corresponding to the first article support;

operating the transfer apparatus of the second vehicle to have the second article supported on the second article support; and operating the transfer apparatus of the first vehicle to have the first article supported on the first article support.

\* \* \* \* \*